United States Patent
Uchikoba et al.

(10) Patent No.: US 6,741,118 B2
(45) Date of Patent: May 25, 2004

(54) SEMICONDUCTOR INTEGRATED CIRCUIT DEVICE AND METHOD OF MANUFACTURING THE SAME

(75) Inventors: Toshitaka Uchikoba, Ashiya (JP); Yuji Yamasaki, Mishima-gun (JP); Kenichi Origasa, Takatsuki (JP); Kiyoto Ohta, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/306,588

(22) Filed: Nov. 27, 2002

(65) Prior Publication Data

US 2003/0098736 A1 May 29, 2003

(30) Foreign Application Priority Data

Nov. 29, 2001 (JP) ........................................ 2001-365046

(51) Int. Cl.[7] ................................................. G05F 1/10
(52) U.S. Cl. ........................ 327/541; 327/537; 327/540
(58) Field of Search ................................ 327/534, 535, 327/536, 540, 541, 543, 546; 363/59

(56) References Cited

U.S. PATENT DOCUMENTS

| | | | | |
|---|---|---|---|---|
| 4,769,784 A | * | 9/1988 | Doluca et al. | ............... 365/149 |
| 4,794,278 A | * | 12/1988 | Vajdic | .......................... 327/537 |
| 5,367,489 A | * | 11/1994 | Park et al. | .............. 365/189.11 |
| 5,805,509 A | | 9/1998 | Leung et al. | ........... 365/189.09 |
| 5,818,290 A | * | 10/1998 | Tsukada | ....................... 327/537 |
| 5,917,354 A | * | 6/1999 | Nakai et al. | ................. 327/198 |
| 5,929,693 A | * | 7/1999 | Kuroda | ......................... 327/535 |
| 6,115,295 A | | 9/2000 | Surlekar et al. | ........ 365/189.09 |
| 6,356,499 B1 | * | 3/2002 | Banba et al. | ................ 365/226 |
| 6,424,203 B1 | * | 7/2002 | Bayadroun | ................... 327/536 |

* cited by examiner

*Primary Examiner*—Terry D. Cunningham
(74) *Attorney, Agent, or Firm*—Merchant & Gould P.C.

(57) ABSTRACT

A semiconductor integrated circuit device includes a charge pump circuit for outputting a predetermined negative voltage to a negative voltage node, a voltage detection circuit for generating a first detection signal when the voltage of the negative voltage node has reached a first detection voltage and for generating a second detection signal when the voltage of the negative voltage node has reached a second detection voltage, an oscillator that is driven in response to the first detection signal so as to generate a signal for driving the charge pump circuit, and a negative voltage raising circuit that has an output terminal connected to the negative voltage node, and that is driven in response to the second detection signal so as to raise the voltage of the negative voltage node through the output of its output terminal. The VBB voltage can be increased rapidly and can be controlled at higher speeds, thereby increasing the stability of the voltage.

29 Claims, 11 Drawing Sheets

SEMICONDUCTOR INTEGRATED CIRCUIT DEVICE AND METHOD OF MANUFACTURING THE SAME

BACKGROUND OF THE INVENTION

1. Field of the Invention

The present invention relates to semiconductor integrated circuit devices in which the stability of the negative voltage generated by a negative voltage generating circuit is increased, and methods of manufacturing such semiconductor integrated circuit devices.

2. Description of the Related Art

As manufacturing processes have become progressively miniaturized in recent years, there has arisen a need for system LSIs for specific applications that include dynamic random access memories (hereinafter, abbreviated as DRAM) and for which standard CMOS manufacturing processes can be used.

Conventionally, the negative voltage (VBB voltage) generated by a negative voltage generating circuit in the DRAM has been used as the well voltage of memory cell portions employing a triple well structure. Planar memory cell structures have been adopted as a way to form DRAMs through standard CMOS processing, as mentioned above, without the use of a triple well.

Here, FIG. 11 shows a planar memory cell structure. Numeral 300 denotes a p-type semiconductor substrate connected to a ground voltage VSS. An n-well 310 is formed in the upper portion of the p-type semiconductor substrate 300, and in the upper portion of the n-well 310 are formed a high-concentration n-type diffusion layer 320 and high-concentration p-type diffusion layers 330. A VDD power source is connected via the high-concentration n-type diffusion layer 320, and a bit line BL is connected to one of the high-concentration p-type diffusion layers 330. A gate 340 is a word line WL with an internally stepped down power source VINT as its power source. The two high-concentration p-type diffusion layers 330 and the gate 340 together make up a PMOS access transistor 360. The high-concentration p-type diffusion layer 330 to which the bit line BL is not connected and a memory cell plate 350 connected to VBB make up a PMOS memory cell capacitor 370.

This memory cell operates as follows. The PMOS access transistor 360 is activated by setting the gate 340, that is, the word line WL, to the ground voltage VSS, and data are written by injecting a charge from the bit line BL into the channel region formed near the surface of the n-well 310 below the memory cell plate 350.

FIG. 12 is an equivalent circuit of this planar memory cell structure.

As shown in FIGS. 11 and 12, the VDD power source, which is a positive voltage, is used for the well voltage of the memory cell portion in which the PMOS access transistor 360 is employed, and the VBB voltage, which is a negative voltage, is used as the memory cell plate power source for the PMOS memory cell capacitor 370.

Next, a conventional semiconductor memory device with the above planar memory cell structure is described. FIG. 13 is a block diagram of the conventional semiconductor memory device. Numeral 410 denotes a VBB voltage generating circuit and 480 denotes a memory cell array having a memory cell plate with a negative charge. The VBB voltage generating circuit 410 includes a charge pump circuit 420 for generating VBB voltage, a ring oscillator 430 for generating pulse signals that cause the charge pump circuit 420 to perform a charge pump operation, a VBB voltage detection circuit 450 to which the VBB voltage is fed back and which generates signals (BBDOWN) for activating the ring oscillator 430, and a constant voltage generating circuit 460 for generating a reference voltage that is used by the VBB voltage detection circuit 450. The VBB voltage detection circuit 450 is made of a comparison voltage generating circuit 451 and a non-inverting amplifier 454 for lowering the VBB voltage.

The comparison voltage generating circuit 451 is a series circuit of a resistor R21 and a resistor R22. One terminal of the resistor R21 is connected to a node of a constant voltage VREG output from the constant voltage generating circuit 460, and the other end is connected to one terminal of the resistor 22 and is also connected to a node of a comparison voltage VCOMP that is applied to a non-inverting input terminal (+) of the non-inverting amplifier 454 for lowering the VBB voltage. The other end of the resistor R22 is connected to the VBB node.

The operation of the semiconductor memory device configured as above is described below. The non-inverting amplifier 454 has two input terminals and one output terminal. As mentioned above, the comparison voltage VCOMP is applied to the non-inverting input terminal (+) and a reference voltage VREF (in the present conventional example, the ground voltage VSS) is applied to the inverting input terminal (−). Consequently, if the VCOMP voltage is higher than the reference voltage VREF, that is, the ground voltage VSS, then a voltage of the BBDOWN node, which is the output, become a logic 'HIGH' voltage (hereinafter, referred to simply as HIGH voltage), and if the VCOMP voltage is lower than the ground voltage VSS, then the BBDOWN node becomes a logic 'LOW' voltage (hereinafter, referred to simply as LOW voltage).

When the BBDOWN voltage is HIGH voltage, the ring oscillator 430 self-oscillates, and the charge pump circuit 420 that receives this oscillated pulse executes a pumping operation that causes the VBB voltage to drop. On the other hand, when the BBDOWN voltage is LOW voltage, the ring oscillator 430 does not self-oscillate, and the operation of the charge pump circuit 420 is stopped.

The VCOMP voltage is determined by the voltage division ratio of the resistor R21 and the resistor R22, and is expressed by Equation (1).

$$VCOMP = VBB + \{R22(VREG - VBB)\}/(R21 + R22) \qquad (1)$$

If the resistor voltage division ratio determined by the resistor R21 and the resistor R22 is such that the VCOMP voltage is equal to the VREF (VSS) voltage when the VBB voltage is a desired voltage, the VBB voltage can be maintained at the desired voltage.

However, with the aforementioned conventional semiconductor memory device, although the VBB voltage can be actively lowered by activating the charge pump circuit, there is no function for raising the VBB voltage. Originally, if left free, the VBB voltage rises naturally due to leakage current, for example, in due time. Moreover, because the requirements for voltage control of the VBB current were not particularly stringent (for example, about ±50 mV fluctuation), it was adequate to provide only a function for lowering the VBB voltage.

As mentioned above, however, if the VBB voltage, which is a negative voltage, is used as the plate power source of the memory cell capacitor, then more stringent voltage control for the VBB voltage (for example, about ±10 mV fluctuation) becomes necessary. Also, ordinarily, due to reductions in power, the ability of the VBB voltage generating circuit to supply negative current is limited, that is, there is a high output impedance. Thus, when writing data to the memory cell capacitor, the memory cell plate voltage fluctuates due to capacitive coupling. If the VBB voltage rises due to this capacitive coupling, the VBB voltage can be lowered to the set voltage by operating the charge pump circuit. However, if VBB falls below the set voltage, it takes time for the VBB voltage to return to the set voltage, because the conventional VBB voltage generating circuits do not have a function for lowering the voltage. If data are read out from the memory when the VBB voltage is lower than the set voltage, the read voltage becomes low due to coupling, and this is problematic because it leads to the read out of erroneous data.

The above problem is not limited to semiconductor memory devices, and is common to general semiconductor integrated circuit devices having a configuration in which negative voltage (VBB voltage) generated by a negative voltage generating circuit is supplied.

SUMMARY OF THE INVENTION

Therefore, in light of the foregoing conventional problems, it is an object of the present invention to provide a semiconductor integrated circuit device onto which is installed a circuit for raising the VBB voltage so as to raise the VBB voltage quickly and control the VBB voltage at high speeds, thereby achieving voltage stability and preventing malfunctions.

To solve the foregoing problems, a semiconductor integrated circuit device of the present invention is provided with a charge pump circuit for outputting a predetermined negative voltage to a negative voltage node, a voltage detection circuit for generating a first detection signal when the voltage of the negative voltage node has reached a first detection voltage and for generating a second detection signal when the voltage of the negative voltage node has reached a second detection voltage, an oscillator that is driven in response to the first detection signal so as to generate a signal for driving the charge pump circuit, and a negative voltage raising circuit that has an output terminal connected to the negative voltage node, and that is driven in response to the second detection signal so as to raise the voltage of the negative voltage node through the output of its output terminal.

With this configuration, when the negative voltage falls below the second detection voltage, the voltage detection circuit generates a second detection signal, and in response to this second detection signal, the negative voltage raising circuit supplies current to the negative voltage node and thereby raises the voltage. Consequently, the function for raising the negative voltage is activated when the negative voltage is lower than the second detection voltage. By performing this control to raise the negative voltage quickly, a more stable negative voltage can be supplied to the load and malfunction of the semiconductor integrated circuit device can be prevented.

The second detection voltage may be lower than the first detection voltage.

The voltage detection circuit may have a configuration that includes a first comparison voltage generating circuit for outputting a first comparison voltage and a second comparison voltage in response to the voltage of the negative voltage node, a reference voltage generating circuit for outputting a reference voltage, a first amplifier for comparing the reference voltage and the first comparison voltage and amplifying the voltage difference between them to generate the first detection signal, and a second amplifier for comparing the reference voltage and the second comparison voltage and amplifying the voltage difference between them to generate the second detection signal.

The first comparison voltage generating circuit may have a configuration that includes a first resistive element, a second resistive element and a third resistive element, wherein one terminal of the first resistive element is connected to a constant voltage node, another terminal of the first resistive element is connected to one terminal of the second resistive element, another terminal of the second resistive element is connected to one terminal of the third resistive element, and another terminal of the third resistive element is connected to the negative voltage node. The second comparison voltage is the voltage of a node at which the first resistive element and the second resistive element are connected, and the first comparison voltage is the voltage of a node at which the second resistive element and the third resistive element are connected.

The reference voltage generating circuit may have a configuration that includes a fourth resistive element and a fifth resistive element, wherein one terminal of the fourth resistive element is connected to a constant voltage node, another terminal of the fourth resistive element is connected to one terminal of the fifth resistive element, and another terminal of the fifth resistive element is connected to a ground voltage. The reference voltage is the voltage of a node at which the fourth resistive element and the fifth resistive element are connected.

It is preferable that the fourth resistive element and the fifth resistive element have variable resistances, and that by changing the resistances of the fourth resistive element and the fifth resistive element, the voltage value of the reference voltage that is output from the reference voltage generating circuit can be changed.

Also, it is preferable that the first resistive element, the second resistive element, and the third resistive element have variable resistances, and that by changing the resistances of the first resistive element, the second resistive element, and the third resistive element, the voltage values of the first comparison voltage and the second comparison voltage that are output from the comparison voltage generating circuit can be changed.

It is preferable that each of the fourth resistive element and the fifth resistive element includes a plurality of resistors connected in series, a fuse is connected in parallel to at least one of the resistors, and the overall resistance can be changed by opening at least one of the fuses.

Also, it is preferable that each of the first, second, and the third resistive elements includes a plurality of resistors connected in series, a fuse is connected in parallel to at least one of the resistors, and the overall resistance can be changed by opening at least one of the fuses.

The reference voltage generating circuit may have a configuration that includes a fourth resistive element and a fifth resistive element, wherein one terminal of the fourth resistive element is connected to a constant voltage node, another terminal of the fourth resistive element is connected to one terminal of the fifth resistive element, and another terminal of the fifth resistive element is connected to a ground voltage, the reference voltage being the voltage of a node at which the fourth resistive element and the fifth resistive element are connected. At least one of the first, second, third, fourth, and fifth resistive elements includes a plurality of resistors connected in series, a fuse is connected in parallel to at least one of the resistors, and the overall resistance can be changed by opening at least one of the fuses.

It is preferable that the resistances of the plurality of resistors are set so that the negative voltage is changed linearly by trimming the fuse.

The negative voltage raising circuit may be a transistor having a control terminal for receiving the second detection signal, a terminal connected to a positive voltage power source, and a terminal connected to the negative voltage node. Alternatively, the negative voltage raising circuit may be a transistor having a control terminal for receiving the second detection signal, a terminal that is grounded, and a terminal connected to the negative voltage node.

The first amplifier and the second amplifier may have respective first and second current mirror-type differential amplifiers, and a constant current value of the transistor serving as a constant current source of the second current mirror-type differential amplifier is larger than a constant current value of the transistor serving as a constant current source of the first current mirror-type differential amplifier. Alternatively, each of the first amplifier and the second amplifier may have a three-stage current mirror-type differential amplifier.

The first comparison voltage may be lower than the second comparison voltage. It is preferable that the number of transistors making up the negative voltage raising circuit can be changed corresponding to the size of a load that is connected to the negative voltage node.

It is preferable that the device further includes a resistor, one terminal of which is connected to the negative voltage node and another terminal of which is connected to a load. In this configuration, a memory cell array further may be included, and that the load may be a memory cell plate of the memory cell array. Additionally, it is preferable that the size of the load can be changed depending on the number of installed memory bits, and that the number of transistors making up the negative voltage raising circuit may be changed in response to the number of installed memory bits. Also, it is preferable that the size of the load can be changed depending on the number of activated blocks of the memory cell array, and the number of transistors making up the negative voltage raising circuit can be changed in response to the number of activated blocks.

It is preferable that the device further includes a diode, one terminal of which is connected to a node connecting the resistor and the load, and that another end of the diode is connected to the ground voltage.

It is preferable that the device further includes a pad connected to a node connecting the resistor and the load, and that via the pad, voltage can be imparted from the outside and a voltage of the node can be detected. Also, it is possible that an output node of the negative voltage raising circuit is connected to a node connecting the resistor and the load, and that an output node of the negative voltage raising circuit is connected to the negative voltage node via the resistor.

The device further may include a resistor, one terminal of which is connected to the negative voltage node and another terminal of which is connected to a load. Further the first comparison voltage generating circuit may include a second comparison voltage generating circuit and a third comparison voltage generating circuit. The second comparison voltage generating circuit may have a sixth resistive element and a seventh resistive element, one terminal of the sixth resistive element being connected to a constant voltage node, another terminal of the sixth resistive element being connected to one terminal of the seventh resistive element, and another terminal of the seventh resistive element being connected to the negative voltage node. The third comparison voltage generating circuit may have an eighth resistive element and a ninth resistive element, one terminal of the eighth resistive element being connected to the constant voltage node, another terminal of the eighth resistive element being connected to one terminal of the ninth resistive element, and another terminal of the ninth resistive element being connected to a node linking the resistor and the load. The first comparison voltage is the voltage of a node at which the sixth resistive element and the seventh resistive element are connected, and the second comparison voltage is the voltage of a node at which the eighth resistive element and the ninth resistive element are connected.

In this configuration, it is preferable that each of the eighth resistive element and the ninth resistive element have variable resistances, and that by changing the resistances of the eighth resistive element and the ninth resistive element, the voltage value of the second comparison voltage that is output from the comparison voltage generating circuit can be changed. Also, it is preferable that one of the sixth resistive element and the seventh resistive element have variable resistances, and that by changing the resistances of the sixth resistive element and the seventh resistive element, the voltage value of the first comparison voltage that is output from the comparison voltage generating circuit can be changed.

It is preferable that a difference between a set voltage of the first detection voltage and a set voltage of a second detection voltage is larger than a maximum value of the total of an offset voltage of the first amplifier and an offset voltage of the second amplifier. Also it is also preferable that a capacitor is inserted between a reference voltage node to which the output of the reference voltage generating circuit is supplied and a ground voltage.

A method of manufacturing a semiconductor integrated circuit of the present invention is a method of manufacturing a semiconductor integrated circuit device with which the voltage value of the reference voltage that is output from the reference voltage generating circuit can be changed by adjusting the resistances of the aforementioned fourth resistive element and the fifth resistive element.

The method includes: preparing a semiconductor integrated circuit device including, in addition to the above configuration, a resistor, one terminal of which is connected to the negative voltage node and another terminal of which is connected to a load, and a pad that is connected to a node connecting the resistor and the load, wherein a voltage of the negative voltage node can be detected via the pad; and detecting, during wafer testing, a voltage appearing on the pad and changing the resistances of the fourth resistive element and the fifth resistive element so as to adjust the voltage value of the reference voltage that is output from the reference voltage generating circuit.

The aforementioned semiconductor integrated circuit device with which the voltage value of the first comparison voltage and the second comparison voltage that are output from the comparison voltage generating circuit can be changed by adjusting the resistances of the first resistive element, the second resistive element and the third resistive element, can be manufactured through the following method.

The method includes; preparing a semiconductor integrated circuit device including, in addition to the above configuration, a resistor, one terminal of which is connected to the negative voltage node and another terminal of which is connected to a load, and a pad that is connected to a node connecting the resistor and the load, wherein a voltage of the negative voltage node can be detected via the pad; and detecting, during wafer testing, a voltage appearing on the pad and changing the resistances of the first resistive element, the second resistive element, and the third resistive element so as to adjust the voltage values of the first comparison voltage and the second comparison voltage that are output from the comparison voltage generating circuit.

Another semiconductor integrated circuit device of the present invention is provided with a charge pump circuit for outputting a predetermined output voltage to an output voltage node; a voltage detection circuit for generating a first detection signal when the voltage of the output voltage node has reached a first detection voltage and for generating a second detection signal when the voltage of the output voltage node has reached a second detection voltage; an oscillator that is driven in response to the first detection signal so as to generate a signal for driving the charge pump circuit; and an output voltage transition circuit that has an output terminal connected to the output voltage node, and that is driven in response to the second detection signal so as to change the voltage of the output voltage node through the output of the output terminal to a direction reverse to a direction driven by the charge pump circuit.

According to this configuration, when the output voltage of the charge pump circuit reaches the second detection voltage, the voltage detection circuit generates a second detection signal, and in response to the second detection signal, the output voltage transition circuit changes the direction of the voltage of the output voltage node to opposite the direction in which it is driven by the charge pump circuit. Thus, by performing a control in which the voltage is rapidly shifted to the opposite direction even if the output voltage of the charge pump circuit exceeds the desired value, a more stable output voltage can be supplied to the load and malfunction of the semiconductor integrated circuit device can be prevented.

DESCRIPTION OF THE PREFERRED EMBODIMENTS

Hereinafter, several embodiments of the present invention are described. Each embodiment serves as an example of the semiconductor memory device, however, the present invention can also be applied to general semiconductor integrated circuit devices having a configuration in which negative voltage (VBB voltage) generated by a negative voltage generating circuit is supplied.

Embodiment 1

Figure 1:
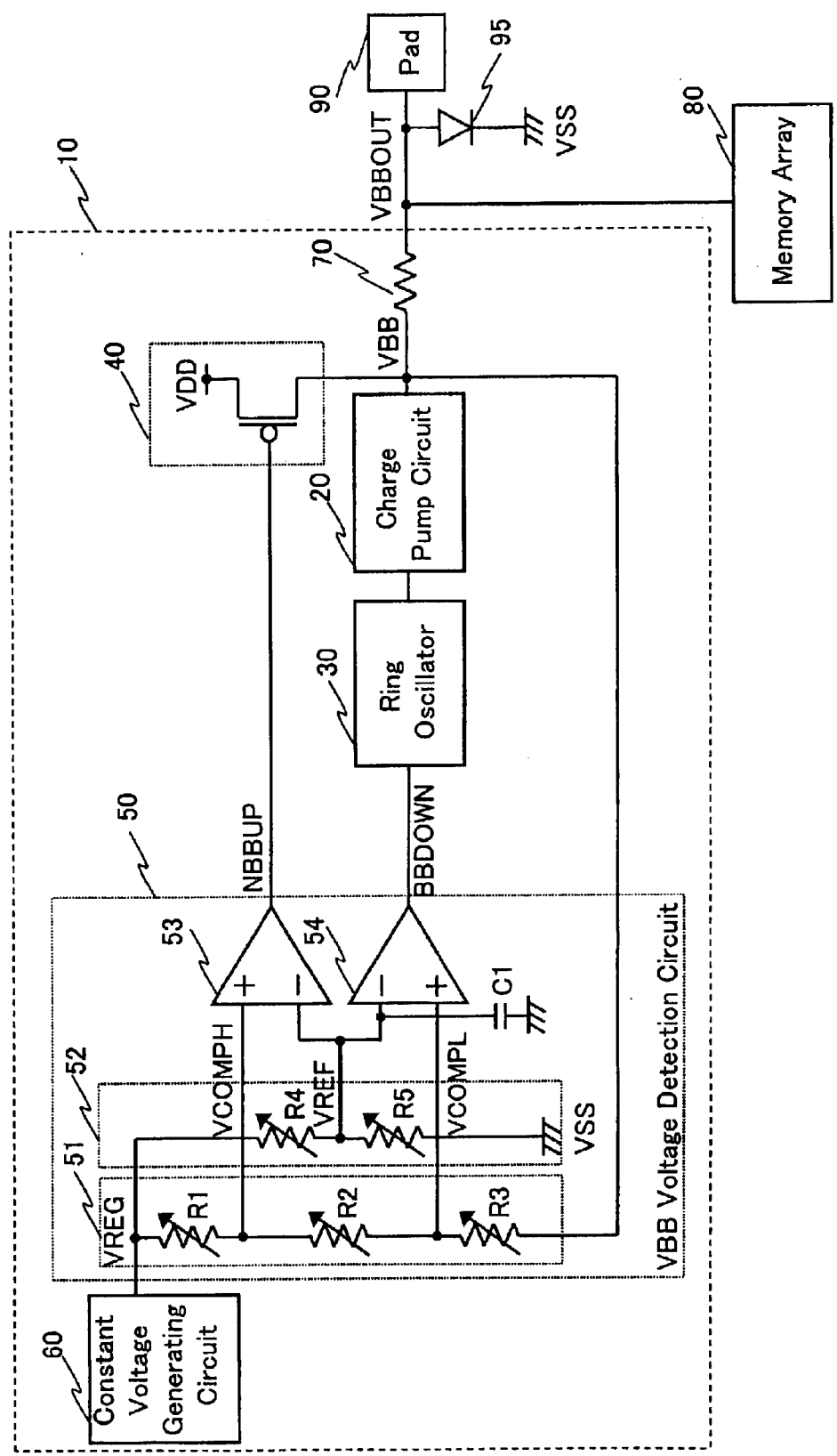
FIG. 1 is a block diagram showing a semiconductor memory device according to Embodiment 1 of the present invention.

FIG. 1 is a block diagram showing the semiconductor memory device according to Embodiment 1 of the present invention. In FIG. 1, numeral 10 denotes a VBB voltage generating circuit. The output node of the VBB voltage generating circuit 10 is connected to a memory cell array 80 with a memory cell plate that serves as a load, a pad 90 that either supplies VBB voltage from outside the DRAM or monitors the VBB voltage that is generated by the VBB voltage generating circuit 10, and a protective diode 95.

The VBB voltage generating circuit 10 includes a charge pump circuit 20 for generating VBB voltage, a ring oscillator 30 for generating a pulse signal that causes the charge pump circuit 20 to perform a charge pump operation, a VBB voltage raising circuit 40 whose output is connected to the VBB node and which raises the VBB voltage, a VBB voltage detection circuit 50 to which the VBB node is connected and which is for generating signals that activate the ring oscillator 30 and the VBB voltage raising circuit 40, a constant voltage generating circuit 60 for generating a voltage that serves as a reference for the VBB voltage detection circuit 50, and a resistor 70 that is connected to the output node of the charge pump circuit 20.

The VBB voltage detection circuit 50 includes a comparison voltage generating circuit 51, a reference voltage generating circuit 52, a non-inverting amplifier 53 for raising the VBB voltage, a non-inverting amplifier 54 for lowering the VBB voltage, and a capacitor C1.

The comparison voltage generating circuit 51 is a series circuit of a resistor R1, a resistor R2, and a resistor R3. One terminal of the resistor R1 is connected to a node of a constant voltage VREG that is output from the constant voltage generating circuit 60, and the other end is connected to one terminal of the resistor R2 and also is connected to a node of a comparison voltage VCOMPH that is applied to the non-inverting input terminal (+) of the non-inverting amplifier 53 for raising the VBB voltage. The other end of the resistor R2 is connected to one terminal of the resistor R3, and also is connected to a node of a comparison voltage VCOMPL that is applied to the non-inverting input terminal (+) of the non-inverting amplifier 54 for lowering the VBB voltage. The other end of the resistor R3 is connected to the VBB node.

The reference voltage generating circuit 52 is a series circuit made of a resistor R4 and resistor R5. One terminal of the resistor R4 is connected to a node of the constant voltage VREG that is output from the constant voltage generating circuit 60, and the other end is connected to one terminal of the resistor R5 and is also connected to a node of the reference voltage VREF, which is applied to the inverting input terminal (−) of the non-inverting amplifier 53 and the inverting input terminal (−) of the non-inverting amplifier 54. The other end of the resistor R5 is connected to the ground voltage VSS node. The capacitor C1 is connected between the reference voltage VREF node and the ground voltage VSS.

The operation of the semiconductor memory device according to Embodiment 1 with the above configuration is described below.

The non-inverting amplifier 54 has two input terminals and one output terminal. The above-mentioned comparison voltage VCOMPL is applied to the non-inverting input terminal (+) and the reference voltage VREF is applied to the inverting input terminal (−). If the VCOMPL voltage is higher than the reference voltage VREF, then a voltage of the BBDOWN node, which is the output, becomes HIGH voltage, and if the VCOMPL voltage is lower than VREF; then the BBDOWN node becomes LOW voltage.

When the BBDOWN voltage is HIGH voltage, the ring oscillator 30 self-oscillates, and the charge pump circuit 20 that receives this oscillated pulse executes a pumping operation, and thus the VBB voltage is lowered. On the other hand, when the BBDOWN voltage is LOW voltage, the ring oscillator 30 does not self-oscillate, and the operation of the charge pump circuit 20 is stopped.

The non-inverting amplifier 53 has two input terminals and one output terminal. The above-mentioned comparison voltage VCOMPH is applied to the non-inverting input terminal (+) and the reference voltage VREF is applied to the inverting input terminal (−). If the VCOMPH voltage is higher than the reference voltage VREF, then a voltage of the NBBUP node, which is the output, becomes HIGH voltage, and if the VCOMPH voltage is lower than VREF, then the NBBUP node becomes LOW voltage.

When the NBBUP node is LOW voltage, the PMOS transistor making up the VBB voltage raising circuit 40 is turned on so that current from the VDD power source flows to the VBB node, thereby raising the VBB voltage. On the other hand, if the NBBUP node is HIGH voltage, the PMOS transistor making up the VBB voltage raising circuit 40 is turned off, and the VBB voltage is not raised.

The VCOMPH voltage is determined by the voltage division ratio of the resistor R1, the resistor R2, and the resistor R3, and is expressed by Equation (2).

$$VCOMPH = VBB + \{(R2+R3) \times (VREG-VBB)\}/(R1+R2+R3) \quad \text{Equation (2)}$$

The VCOMPL voltage is determined by the voltage division ratio of the resistor R1, the resistor R2, and the resistor R3, and is expressed by Equation (3).

$$VCOMPL = VBB + \{R3(VREG-VBB)\}/(R1+R2+R3) \quad \text{Equation (3)}$$

The VREF voltage is determined by the voltage division ratio of the resistor R4 and the resistor R5, and is expressed by Equation (4).

$$VREF = (R5 \times VREG)/(R4+R5) \quad \text{Equation (4)}$$

Here, if the VBB voltage when VCOMPH and VREF are equal, that is, the detection voltage for raising the VBB voltage, is given as VBBUP, then VBBUP is expressed by Equation (5).

$$VBBUP = \{R5 \times R1 - R4(R2+R3)\} VREG / \{R1(R4+R5)\} \quad \text{Equation (5)}$$

Here, if the VBB voltage when VCOMPL and VREF are equal, that is, the detection voltage for lowering the VBB voltage due to charge pumping, is given as VBBDN, then VBBDN is expressed by Equation (6).

$$VBBDN = \{R5(R1+R2) - R3 \times R4\} VREG / \{(R1+R2)(R4+R5)\} \quad \text{Equation (6)}$$

To summarize the above relationships, when the VBB voltage is larger than the detection voltage VBBDN, the charge pump circuit 20 is operated in order to lower the VBB voltage, and the VBB voltage is lowered, and when the VBB voltage is smaller than the detection voltage VBBUP, the VBB voltage raising circuit 40 is activated in order to raise the VBB voltage, and the VBB voltage is raised. This relationship is explained with reference to FIG. 2.

Figure 2:
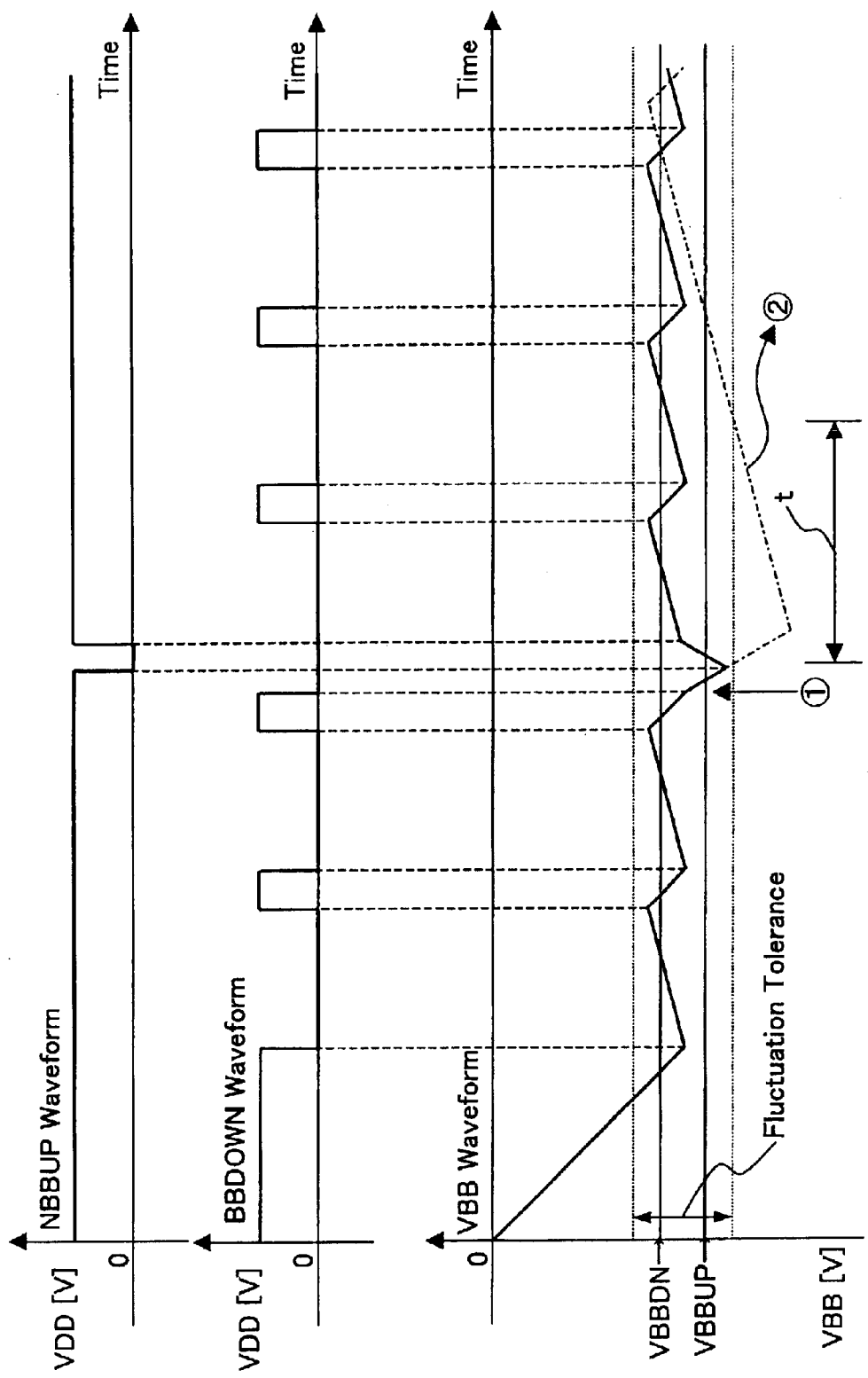
FIG. 2 is a diagram of the operational waveforms of the semiconductor memory device of FIG. 1.

The upper section of FIG. 2 is the NBBUP waveform, the middle section is the BBDOWN waveform, and the lower section is the VBB voltage waveform. The horizontal axis denotes time and the vertical axis denotes voltage.

As mentioned above, when the VBB voltage is larger than the detection voltage VBBDN, BBDOWN becomes HIGH voltage, and the ring oscillator self-oscillates and causes the charge pump circuit 20 to operate, thereby lowering the VBB voltage. Then, when the VBB voltage falls below the detection voltage VBBDN, BBDOWN becomes LOW voltage, and the charge pump circuit 20 is stopped so that the VBB voltage rises gently due to leakage current. If the VBB voltage once again rises above the detection voltage VBBDN, then BBDOWN becomes HIGH voltage, and the charge pump circuit 20 is operated so as to lower the VBB voltage. Through this series of operations, the VBB voltage is kept at a predetermined voltage.

Here, a slight time delay between the time when the VBB voltage traverses the detection voltage VBBDN (likewise with VBBUP) and the time when BBDOWN (likewise with NBBUP) actually becomes HIGH voltage or LOW voltage is the result of a delay that occurs at the VBB voltage detection circuit.

In FIG. 2, (1) indicates the timing at which the VBB voltage starts dropping significantly due to capacitive coupling during the writing of data. At this time, with conventional VBB voltage generating circuits, there is no system for increasing the VBB voltage when the VBB voltage has dropped significantly, and thus, as shown by the dashed line (2), the VBB voltage may exceed the fluctuation tolerance. For the VBB voltage to return to within the fluctuation tolerance, it is necessary to wait for the natural rise in the VBB voltage that occurs due to leak current, and therefore there is a risk that the VBB current will remain below the fluctuation tolerance for a prolonged period, shown by t. Consequently, because the voltage of data during reading is low due to capacitive coupling, a malfunction occurs in which the anticipated data cannot be read.

Here, with the present invention, as shown in FIG. 2, when the VBB voltage drops below the detection voltage VBBUP voltage, then, as mentioned earlier, NBBUP becomes LOW voltage, and the VBB voltage raising circuit configured by the PMOS transistor is activated and allows current from the VDD power source to flow to the VBB node so as to quickly raise the VBB voltage as illustrated by the solid line. Consequently, the VBB voltage quickly returns to near the set voltage without exceeding the fluctuation tolerance, so that the VBB voltage is stable and data can be read and written without malfunctions.

As set forth above, the two detection voltages VBBDN and VBBUP are set based on the two mutually different comparison voltages VCOMPL and VCOMPH, so as to maintain a constant VBB.

Here, if the two comparison voltages VCOMPL and VCOMPH are set to the same voltage, that is, if the detection voltages for raising and for lowering the VBB voltage are set to the same voltage, then the VBB voltage is lowered from a voltage higher than the detection voltage until it reaches the detection voltage, at which point the charge pump circuit stops after a slight delay time, and when the VBB voltage stops dropping, the VBB voltage raising circuit is operated and raises up the VBB voltage. The VBB voltage once again exceeds the detection voltage and the VBB voltage raising circuit stops operating after a slight time delay, and the charge pump circuit starts operating and lowers the VBB voltage. Thus, the VBB voltage theoretically can be maintained even if the control is performed using a single detection voltage.

However, due to processing problems during manufacturing, variation occurs in the transistor dimensions or in the threshold voltage, which causes variation in the properties of the non-inverting amplifiers for VBB voltage generation and for VBB voltage raising. Consequently, the effective detection voltage is shifted, causing an increase in the oscillation amplitude of the VBB voltage. That is, there is a risk that there will be poorer VBB voltage stability than anticipated. Also, as mentioned previously, because there is a slight time delay between when a change in the VBB voltage is detected by the VBB voltage detection circuit and when the VBB voltage is actually increased or decreased, the operations of the VBB voltage raising circuit and the charge pump circuit may occur simultaneously. This is disadvantageous because it increases power consumption.

Consequently, in light of the processing-related variations and the time delays that occur at the VBB voltage detection circuit, for example, it is preferable that two different comparison voltages are used to set two optimal detection voltages. As a result, a stable VBB voltage can be supplied and power consumption can be reduced. To set these two optimal detection voltages, the resistances of the variable resistors R1 to R5 can be determined based on the aforementioned equations (5) and (6), so as to make the potential difference between the set voltages for the detection voltages VBBDN and VBBUP larger than the maximum disparity (offset voltage) in the actual detection voltages that is caused by process-related variations in the two amplifiers for raising and lowering the VBB voltage.

Figure 3:
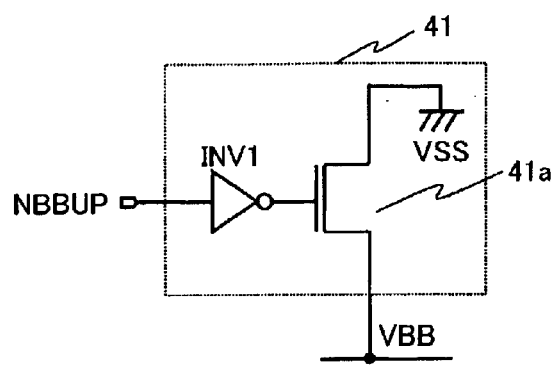
FIG. 3 is a circuit diagram showing another example of the VBB voltage raising circuit included in the semiconductor memory devices according to embodiments of the present invention.

Next, FIG. 3 shows a separate example of the configuration of the VBB voltage raising circuit 40. A VBB voltage raising circuit 41 shown in FIG. 3 includes an inverter INV1 that receives NBBUP as an input signal and an NMOS transistor 41a whose gate terminal receives the output of the inverter INV1. The ground voltage VSS is connected to the drain terminal and the VBB node is connected to the source terminal of the NMOS transistor 41a. Consequently, when the VBB voltage drops below the VBBUP voltage, the NBBUP signal becomes LOW voltage and is converted to HIGH voltage by the inverter INV1, so that HIGH voltage is imparted to the gate terminal of the NMOS transistor 41a. Accordingly, the NMOS transistor 41a is turned on and current from the ground voltage VSS flows into the VBB node, and thus the VBB voltage can be raised. By configuring the VBB voltage raising circuit 41 in this way with the NMOS transistor 41a having the ground voltage VSS as its power source, the ability to supply current to the VBB node is reduced and the speed at which the VBB voltage is raised becomes less abrupt than with the VBB voltage raising circuit 40 configured by a PMOS transistor with the VDD as a power source, and because the power source is set to the ground voltage, power consumption can be kept down. It should be noted that a power source, such as a VDD power source, that is higher voltage than the ground voltage VSS can be used as the power source of the NMOS transistor 41a of the VBB voltage raising circuit 41.

The amplifiers that make up the non-inverting amplifier 53 for raising the VBB voltage and the non-inverting amplifier 54 for lowering the VBB voltage are described with reference to FIG. 4. Numeral 55 denotes a current mirror-type differential amplifier, and INV2 denotes an inverter. Q1, Q2, and Q3 denote PMOS transistors, and load elements Q4 and Q5 denote NMOS current mirrors. The bias point is set such that all transistors Q1 to Q5 operate in saturation region. Also, Q2 and Q3 have the same dimensions and Q4 and Q5 have the same dimensions.

The source terminal of the PMOS transistor Q1 is connected to the VDD power source, its gate terminal is connected to the ground voltage VSS, and its drain terminal is connected to the source terminals of Q2 and Q3 and is a constant current source.

A reference voltage VREF is connected to the gate terminal of the PMOS transistor Q2, and the comparison voltage VCOMPH (or VCOMPL) is connected to the gate terminal of the PMOS transistor Q3. The voltage difference between the two signals that are applied to the gate terminals of the PMOS transistors Q2 and Q3 is amplified, and the product of this amplification is output to the differential amplifier output node AMPOUT. Moreover, the inverter INV2, which has an adjusted switching voltage due to the amplitude range of the output voltage of AMPOUT, is connected, and the output terminal OUT of INV2 is the output of the amplifier that makes up either the non-inverting amplifier 53 or the non-inverting amplifier 54.

The operation is described next. If, for example, the comparison voltage VCOMPH (or VCOMPL) is lower than the reference voltage VREF, then most of the current that flows from the constant current source Q1 flows into the Q3, Q5 system, and as such as AMPOUT potential rises and become HIGH voltage, and the output terminal OUT of the inverter INV2 becomes LOW voltage. On the other hand, if the comparison voltage VCOMPH (or VCOMPL) is higher than the reference voltage VREF, then most of the current that flows from the constant current source Q1 flows into the Q2, Q4 system, and since AMPOUT potential is lowered and becomes LOW voltage, the output terminal OUT of the inverter INV2 becomes HIGH voltage. Through this mechanism, the voltage difference between the reference voltage VREF and the comparison voltage VCOMPH (or VCOMPL) is amplified and the product is output to the output terminal OUT. Also, as mentioned previously, a voltage difference between the reference voltage VREF and the comparison voltage VCOMPH (or VCOMPL) is accompanied by a slight time delay before this result is output to the output terminal OUT. This is known as the delay time of an amplifier, and it can be adjusted by altering the dimensions of the Q1 transistor that serves as the constant current source. For example, if the Q1 transistor dimensions are increased, then the constant current volume is increased, resulting in quicker response times. Conversely, if the Q1 transistor is reduced in size, then the constant current volume becomes small, resulting in slower response times.

Based on this principle, if the dimensions of the Q1 transistor of the amplifiers making up the non-inverting amplifier 53 for raising the VBB voltage and the non-inverting amplifier 54 for lowering the VBB voltage are different, then their constant current volumes become different, and thus the response times of the non-inverting amplifier 53 and the non-inverting amplifier 54 can be set to mutually different values. Here, if the dimensions of the Q1 transistor of the non-inverting amplifier 53 are increased over the dimensions of the Q1 transistor of the non-inverting amplifier 54 so as to increase the constant current volume, then response times can be increased even further. Thus, because the response time of the output signal NBBUP of the non-inverting amplifier 53 becomes high-speed, the VBB voltage can be raised quickly when the VBB voltage falls significantly to the negative side of the set voltage due to capacitive coupling during the writing of data. Consequently, the degree to which the VBB voltage falls negatively can be reduced and the VBB voltage can be further stabilized. Thus malfunctions can be prevented.

Figure 5:
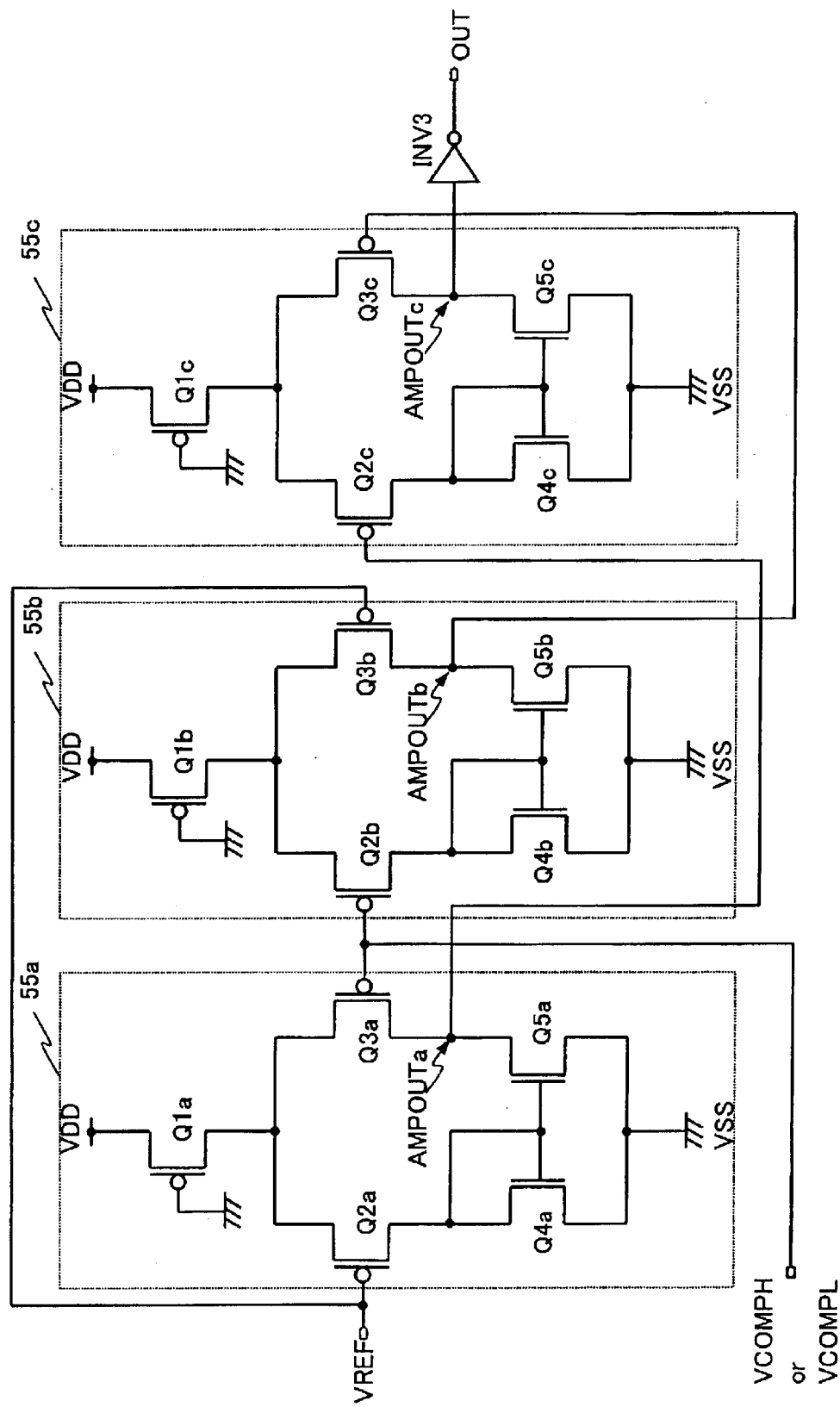
FIG. 5 is a circuit diagram of a non-inverting amplifier having a three-stage current mirror-type differential amplifier and that is included in semiconductor memory devices according to embodiments of the present invention.

FIG. 5 shows a further example of the configuration of the amplifier that is adopted for the non-inverting amplifier 53 and the non-inverting amplifier 54. This configuration example is a circuit in which three identical current mirror-type differential amplifiers are provided.

Numerals 55a, 55b, and 55c denote current mirror-type differential amplifiers. Q1a, Q1b, Q1c, Q2a, Q2b, Q2c, Q3a, Q3b, Q3c denote PMOS transistors, the load elements Q4a, Q5a, Q4b, Q5b, Q4c, and Q5c are NMOS current mirrors, and INV3 denotes an inverter. The bias point is set such that all transistors operate in saturation region. Also, Q2a and Q3a, Q2b and Q3b, and Q2c and Q3c have the same dimensions, Q4a and Q5a, Q4b and Q5b, and Q4c and Q5c have the same dimensions, and Q1a, Q1b, and Q1c have the same dimensions.

The reference voltage VREF is applied to the gates of Q2a and Q3b and the comparison voltage VCOMPH (or VCOMPL) is applied to the gates of Q3a and Q2b. The output AMPOUTa of the current mirror-type differential amplifier 55a is applied to the gate of Q2c, the output AMPOUTh of the current mirror-type differential amplifier 55b is applied to the gate of Q3c, the output AMPOUTc of the amplifier 55c is applied to the inverter INV3, and the output of the inverter INV3 is denoted as OUT.

Figure 4:
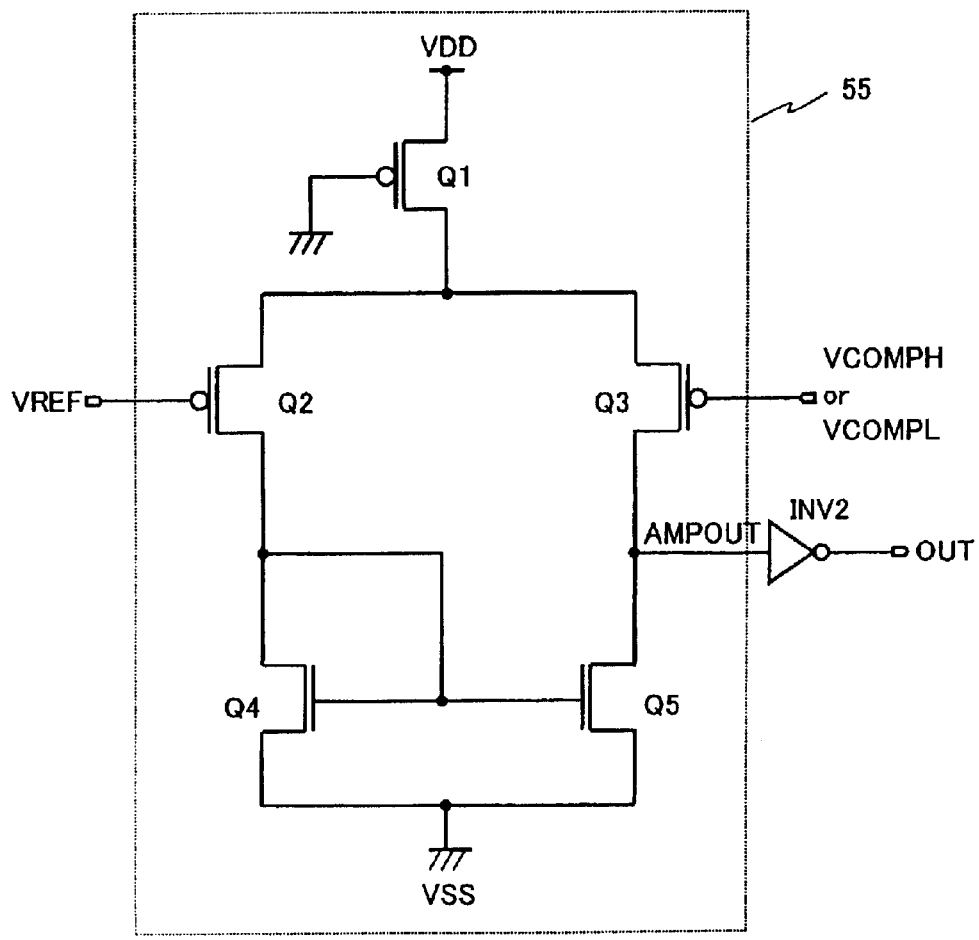
FIG. 4 is a circuit diagram of a non-inverting amplifier having a single-stage current mirror-type differential amplifier and that is included in semiconductor memory devices according to embodiments of the present invention.

The operation of each current mirror-type differential amplifier 55a, 55b, and 55c is identical to the operation of the current mirror-type differential amplifier 55 of FIG. 4, and as such a detailed description thereof is omitted.

Normally, a sufficient output signal amplitude is not obtained with only one current mirror-type differential amplifier. That is, there is low gain. Consequently, an adequate amplitude of the AMPOUTa node and the AMPOUTh node cannot be obtained. Accordingly, these two outputs are additionally applied to the two input gates of the current mirror-type differential amplifier 55c, so that the amplitude can be further amplified. By further amplifying the output amplitude of a current mirror-type differential amplifier that was insufficient with a single amplifier, it can be converted reliably by the inverter INV3 into logic HIGH voltage or logic LOW voltage. That is, by providing a current mirror-type differential amplifier that includes three stages, even miniscule signals are amplified reliably so that a logic HIGH voltage or a logic LOW voltage can be obtained.

Figure 13:
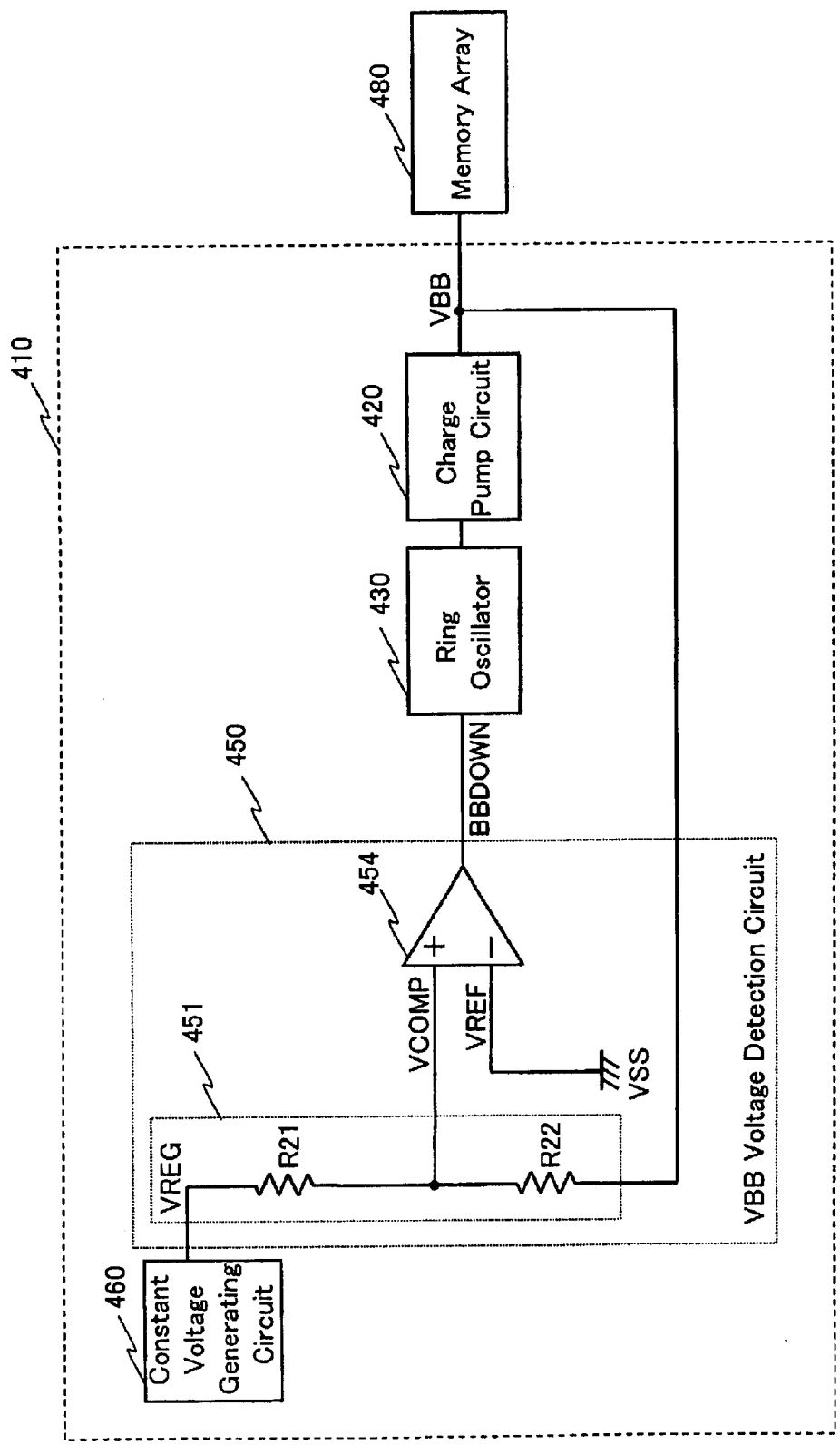
FIG. 13 is a block diagram showing a conventional example of a semiconductor memory device.

A description of the reference voltage VREF follows. Conventionally, as shown in FIG. 13, the reference voltage VREF was set to the ground voltage VSS. As a result, if the VBB voltage is increased so that the comparison voltage VCOMP is raised above the ground voltage VSS, then, as mentioned previously, the charge pump circuit 420 is operated to draw the VBB voltage down toward the negative side. Conversely, if the VBB voltage drops and as a result the comparison voltage VCOM drops below the ground voltage VSS, then the charge pump circuit 420 is stopped. In this case, the VBB voltage when the comparison voltage VCOMP and the reference voltage VREF are equivalent, that is, the VBB set voltage, is of course a negative voltage due to the voltage drop caused by the resistor R22. Thus, as long as the reference voltage VREF is the ground voltage VSS, the set voltage for the VBB voltage is lower than the ground voltage VSS.

Consequently, to set the VBB set voltage to the ground voltage VSS or higher voltage, the reference voltage also must be set to the ground voltage or higher. Accordingly, for example, as shown in FIG. 1, the resistor R5 is inserted between the reference voltage VREF node and the ground voltage VSS and the resistor R4 is inserted between the constant voltage VREG node and the reference voltage VREF node. Thus, as shown in Equation (4), the reference voltage VREF can be set to the voltage of the ground voltage VSS or higher. The comparison voltage VCOMPL, like the reference voltage VREF, can be set to the voltage of the ground voltage VSS or higher, and thus by suitably setting the ratio of the resistor R1, the resistor R2, and the resistor R3, the setting value of the VBB voltage can be set to the ground voltage VSS or higher.

Figure 6:
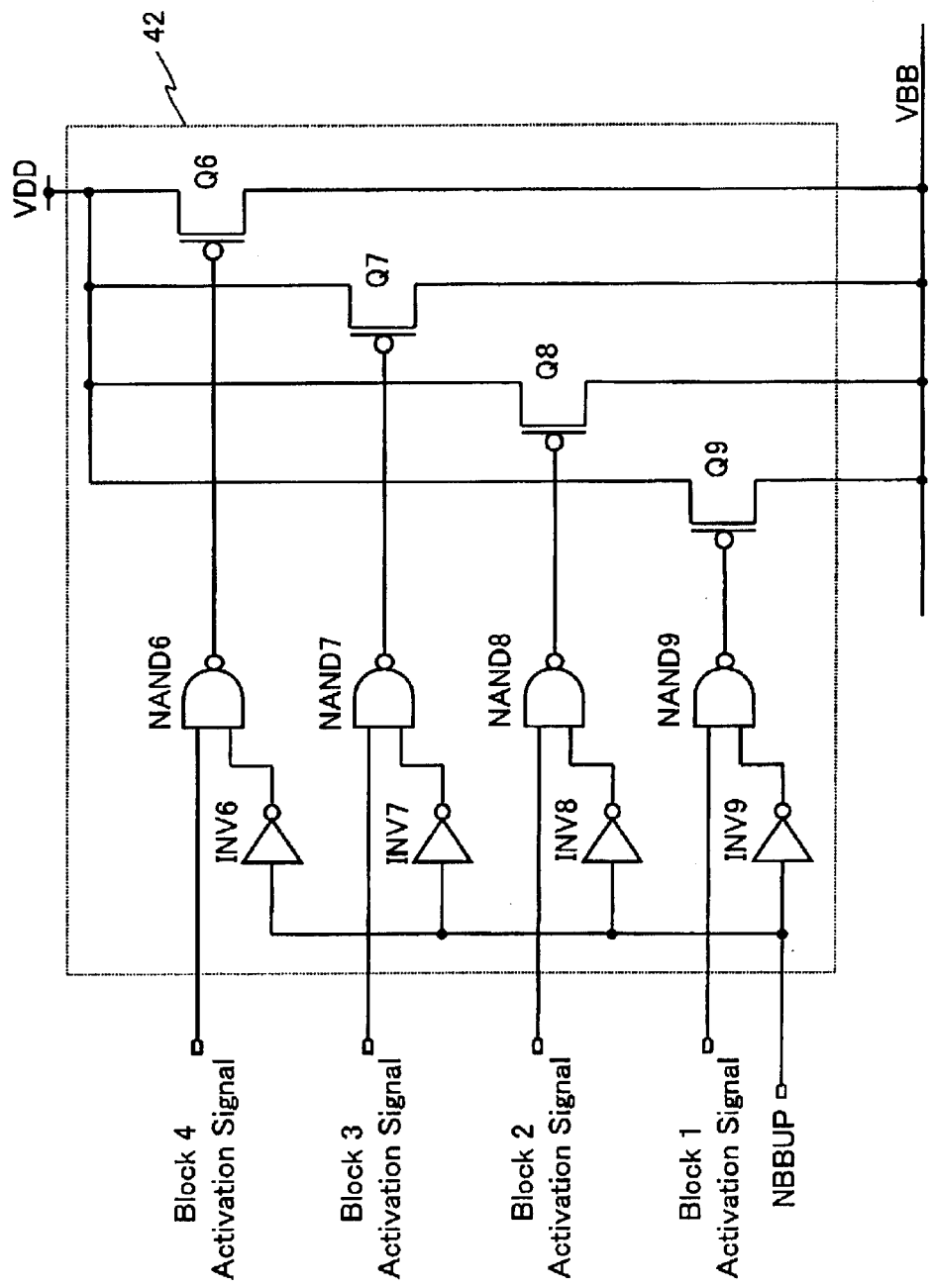
FIG. 6 is a circuit diagram showing another example of the VBB voltage raising circuit included in semiconductor memory devices according to embodiments of the present invention.

Next, FIG. 6 shows yet a further example of the VBB voltage raising circuit 40. A VBB voltage raising circuit 42 shown in FIG. 6 includes inverter circuits INV6, INV7, INV8, and INV9, NAND circuits NAND6, NAND7, NAND8, and NAND9, and PMOS transistors Q6, Q7, Q8, and Q9. The source terminals of the PMOS transistors Q6, Q7, Q8, and Q9 are connected to the VDD power source, and their drain terminals are connected to the VBB node. The output of the NAND6 is applied to the gate terminal of the PMOS transistor Q6. One input of the NAND6 receives the block 4 activation signal, and the other terminal receives the NBBUP signal after it has been inverted by the INV6. Similarly, the output of the NAND7 is applied to the gate terminal of the PMOS transistor Q7, one input of the NAND7 receives a block 3 activation signal, and its other terminal receives the NBBUP signal after it is inverted by the INV7. Likewise, the output of the NAND8 is applied to the gate terminal of the PMOS transistor Q8, an input of the NAND8 receives a block 2 activation signal, and its other terminal receives the NBBUP signal after it is inverted by the INV8. Similarly, the output of the NAND9 is applied to the gate terminal of the PMOS transistor Q9, an input of the NAND9 receives a block 1 activation signal, and its other terminal receives the NBBUP signal after it is inverted by the INV9.

The operation is described next. When the VBB voltage falls below the detection voltage VBBUP, the NBBUP voltage becomes LOW voltage so as to raise the VBB voltage. This results in the outputs of the INV6, the INV7, the INV8, and the INV9 all becoming HIGH and one input each of the NAND6, the NAND7, the NAND8, and the NAND9 receiving a HIGH voltage. When only the block 4 activation signal, for example, of the four block activation signals is HIGH voltage, that is, when only the block 4 is being accessed, the two inputs of the NAND6 both become HIGH. This causes the output of the NAND6 to become LOW Consequently, the PMOS transistor Q6 is turned on and current flows from the VDD power source to the VBB node, allowing the VBB voltage to be raised. At this time, the PMOS transistors Q7, Q8, and Q9 are off. Likewise, when only the block 3 activation signal is HIGH, only the PMOS transistor Q7 is turned on.

If all four block activation signals are HIGH voltage, then all PMOS transistors Q6, Q7, Q8, and Q9 are turned on.

Consequently, if the PMOS transistors Q6, Q7, Q8, and Q9 have the same dimensions, then a current that is four times that when only a single PMOS transistor is on is allowed to flow. Therefore, if there are more activated blocks than during normal operation, such as during auto-refresh, and the load of VBB becomes large, then by giving current capabilities that match this, the VBB voltage can be raised quickly and stable VBB voltage can be supplied. Also, by giving only the current capabilities required by the number of selected activated blocks, current can be supplied without an excess or insufficiencies arising. Consequently, a semiconductor memory device with reduced current consumption can be provided. It should be noted that there are no limitations to the number of activated blocks, and that the activated block signals can serve as signals for identifying the number of installed memory bits (for example, 2 Mbit or 4 Mbit) so that the current capabilities can be switched depending on the number of memory bits.

Next is described the effect of the resistor 70 in FIG. 1 that is inserted between the output node VBB of the charge pump circuit 20 and the node VBBOUT to which the memory cell array 80, the protective diode 95, and the pad 90 are connected. As mentioned previously, the VBB node fluctuates in a saw-tooth manner as shown in the lower section of FIG. 2. Although the VBB voltage fluctuates in this manner, when the resistor 70 is inserted, the filtering effects thereof reduce fluctuations in the amplitude (see the VBBOUT waveform shown in the lower section of FIG. 9, which will be mentioned later). Consequently, the VBB voltage that is supplied to the memory array, which is a load, has a small amplitude fluctuation width and is moreover stable. Thus, the resistor 70 is essential for supplying the power source voltage of the memory cell plate, for which a high degree of stability is required.

Figure 11:
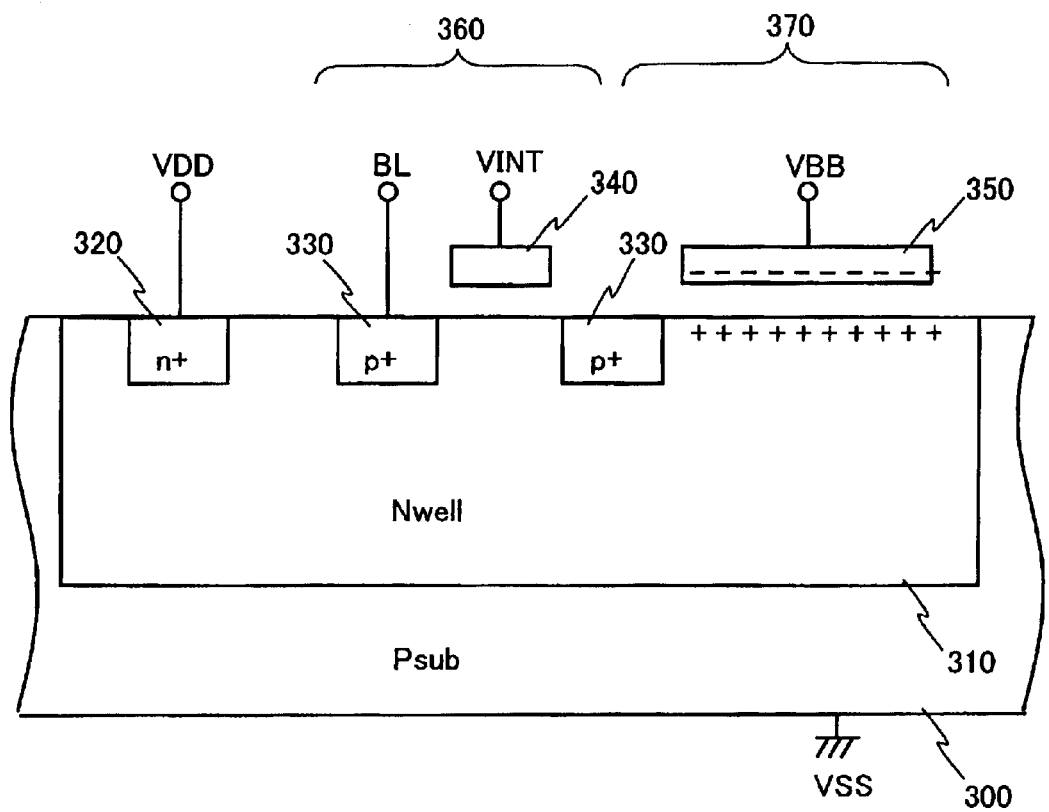
FIG. 11 is a cross-sectional view of the memory cell portion in the semiconductor memory device.
Figure 12:
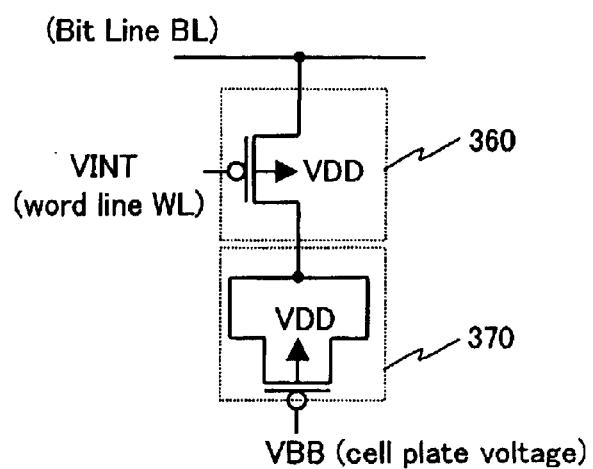
FIG. 12 is an equivalent circuit of the memory cell portion of FIG. 11.

Next, the effect of the protective diode 95 in FIG. 1 that is connected between the VBBOUT node and the ground voltage VSS is described. As shown in FIG. 11, the VBB voltage is supplied to a memory cell plate 350 of a memory cell capacitor 370. The VBB voltage is the ground voltage VSS voltage before the power source is supplied, and by supplying the power source, the potential of an n-well 310 is raised up to the VDD power source. At that time, if there were no protective diode 95, then the VBB voltage would rise up to the VDD power source voltage due to capacitive coupling with the n-well 310, and as a result there is a risk that latch up would occur when the power source is supplied. In addition, time is required before the VBB voltage is drawn down to the predetermined negative voltage. That is, even more time would be required before the power source stabilizes.

Accordingly, when the protective diode 95 is connected between the VBBOUT node and the ground voltage VSS as shown in FIG. 1, the VBBOUT node becomes a positive voltage due to capacitive coupling when power is supplied, and when the VBBOUT node reaches or exceeds the threshold value of the protective diode 95, the protective diode 95 is turned on and current from the VBBOUT is allowed to flow to the ground voltage VSS node. Consequently, the VBBOUT node is clamped at the threshold voltage of the protective diode 95. In other words, by supplying negative current to the VBBOUT node when the power source is supplied, the VBBOUT node can be lowered from a high positive voltage to the threshold voltage of the diode. Thus, by providing the protective diode between the VBBOUT node and the ground voltage VSS, the voltage of the VBBOUT node is clamped at the low threshold voltage of the protective diode 95 without rising up to the VDD voltage, and thus latch up when power is supplied can be prevented and the power source can be stabilized in a shorter time.

Next is a description of the reason behind providing variable resistances for the resistors R1, R2, and R3 making up the comparison voltage generating circuit 51 of the VBB voltage detection circuit 50 shown in FIG. 1 and for the resistors R4 and R5 making up the reference voltage generating circuit 52.

Processing variations, for example during manufacture, lead to variation in the threshold of transistors and the resistances of the resistors. Consequently, in practice, the VBB detection voltage strays from anticipated values. Accordingly, to set the VBB voltage to the setting value, the voltage that appears on the pad 90 during wafer testing can be monitored so that changes can be made in the resistances of the resistors R1, R2, and R3 making up the comparison voltage generating circuit 51 of the VBB voltage detection circuit 50 and the resistors R4 and R5 making up the reference voltage generating circuit 52 and that the comparison voltage value and the reference voltage can be fine tuned. Thus anticipated VBB voltage values can be obtained. The resistors R1, R2, R3, R4, and R5 are variable resistors with variable resistances. The method for changing these resistances is described below with reference to FIG. 7.

Figure 7:
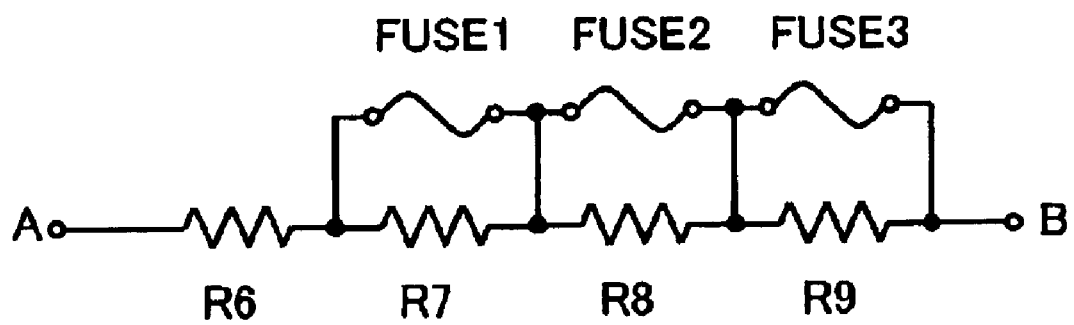
FIG. 7 shows an example of variable resistors included in semiconductor memory devices according to embodiments of the present invention.

In FIG. 7, R6, R7, R8, and R9 are resistors, and FUSE1, FUSE2, and FUSE3 are fuses. The FUSE1 is connected to both ends of the resistor R7, the FUSE2 is connected to both ends of the resistor R8, and the FUSE3 is connected to both ends of the resistor R9. Here, for the sake of simplification, the resistance of the fuses is zero when the fuses are closed and is infinite when the fuses are open. In FIG. 7, each fuse is closed, so that the resistance of the fuses themselves is zero, and as a result, the end portion of the resistor R6 that is connected to the FUSE1 is shorted to the node B. Consequently, the resistance between the A node and the B node is the resistance of R6. If the FUSE1 is open, then the resistance of the FUSE1 itself becomes infinite, so that the node to which the resistors R7 and R8 are connected is shorted to node B, and thus the resistance between the A and B nodes becomes R6+R7. Similarly, if only the FUSE2 is open, then the resistance between the A and B nodes becomes R6+R8. Moreover, if all three fuses are open, then the resistance between the A and B nodes becomes R6+R7+R8+R9. In FIG. 7 there is a total of three fuses, and thus there are eight possible combinations in which the fuses are open or closed. Consequently, there are eight possible values for the resistance between the A and B nodes. Providing fuses in this fashion allows the resistance to be set to a desired value. By changing the resistance using this variable resistor having fuses, the comparison voltages VCOMPH and VCOMPL that are output from the comparison voltage generating circuit 51 and the reference voltage VREF that is output from the reference voltage generating circuit 52 can be fine tuned, and as a result, a particular VBB voltage can be obtained.

For example, in FIG. 7, if node A is set to 1V and node B is set to 0V for a potential difference between A and B of 1V, and the resistances of the four resistors R6 to R9 are the same, then the potential of the node between R6 and R7 when no fuses are open is 0V, the potential of the node between R6 and R7 is 0.5V when one fuse is open, the potential of the node between R6 and R7 is 0.67V when two fuses are open, and the potential of the node between R6 and R7 is 0.75V when all three fuses are open. The change in voltage resulting from opening the fuses is utilized to fine tune the VBB voltage, and if all resistors are given the same resistance, as in the above example, the voltage value does not change linearly. Consequently, the change in the voltage value when the fuses are open can be made linear by setting the resistances so that when the fuses are open, the resistance between the node B and the node between the resistors R6 and R7 is changed at equal spacing to the resistance between the A and B nodes.

It should be noted that there are no limitations on the number and resistance of the resistors, and the number of fuses, making up the above-mentioned variable resistor. Also, to control the VBB voltage with high precision as mentioned above, fine-tuning of the resistor by opening the fuses is necessary, and thus the pad 90 is added so as to monitor the VBB voltage.

The capacitor C1 is connected between the reference voltage VREF node and the ground voltage VSS. This is for the purpose of eliminating noise generated in the reference voltage VREF node. The capacitor C1 has an important function, in the case in which, like in the semiconductor memory device of the present invention, the reference voltage VREF node is applied to two amplifiers, that is, the non-inverting amplifier 53 and the non-inverting amplifier 54. The reason is as follows. There is a risk that when one of the amplifiers, such as the non-inverting amplifier 54, is operating, a noise due to capacitive coupling will enter into the reference voltage VREF node according to a layout-related condition. As a result, the non-inverting amplifier 53 that is not operating picks up the noise, and there is a risk that the non-inverting amplifier 53 will malfunction. As a solution to this, the capacitor C1 is provided between the reference voltage VREF node and the ground voltage VSS so as to eliminate interference and noise between the amplifiers and thereby prevent malfunctioning.

Embodiment 2

Figure 8:
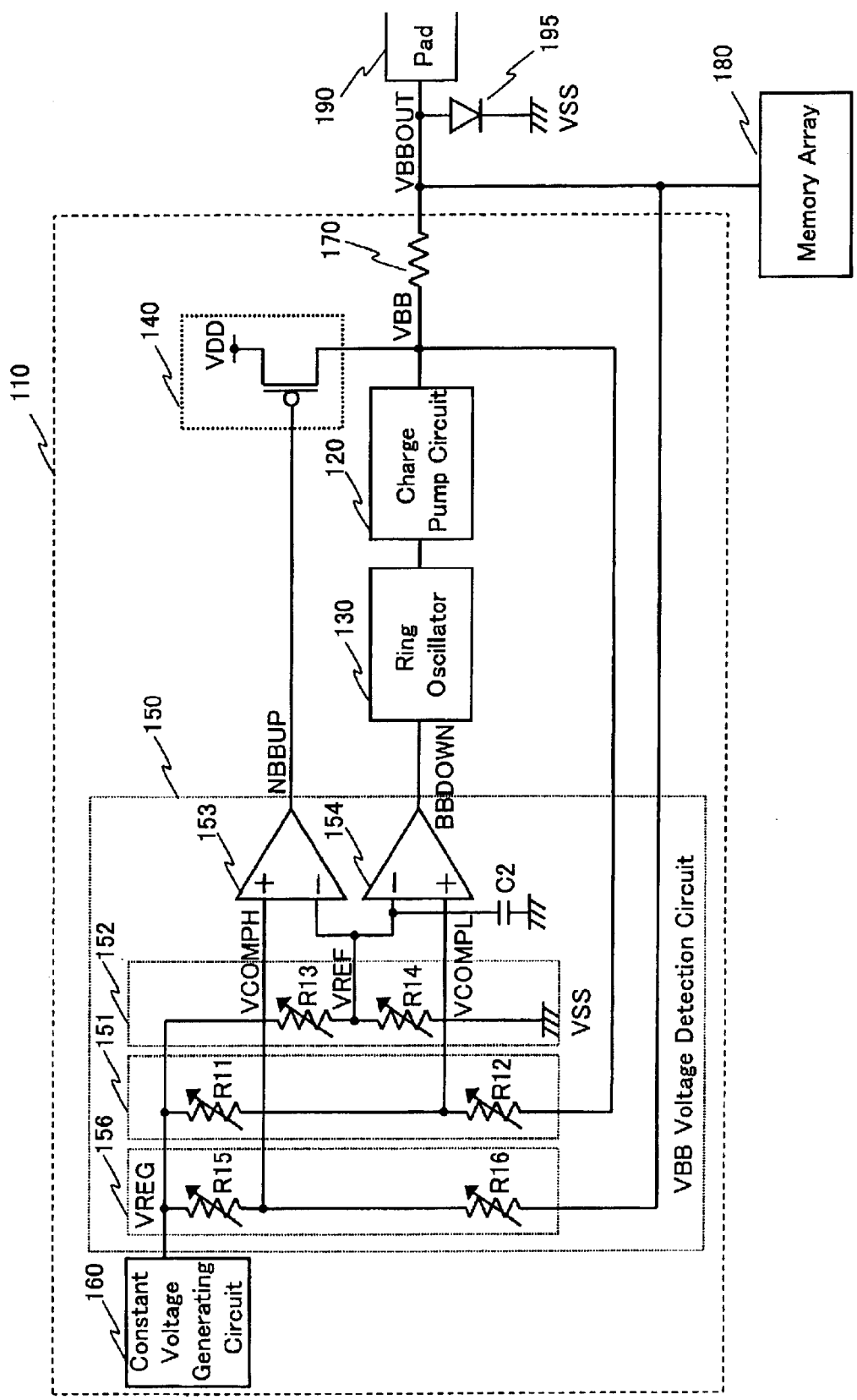
FIG. 8 is a block diagram showing a semiconductor memory device according to Embodiment 2 of the present invention.

FIG. 8 is a block diagram showing the semiconductor memory device according to Embodiment 2. In FIG. 8, numeral 110 denotes a VBB voltage generating circuit. The output node of the VBB voltage generating circuit 110 is connected to a memory cell array 180 having a memory cell plate that serves as a load, a pad 190 that either supplies VBB voltage from outside the DRAM or monitors the VBB voltage that is generated by the VBB voltage generating circuit 110, and a protective diode 195.

The VBB voltage generating circuit 110 includes a charge pump circuit 120 for generating VBB voltage, a ring oscillator 130 for generating a pulse signal that causes the charge pump circuit 120 to perform a charge pump operation, a VBB voltage raising circuit 140 whose output is supplied to the VBB node and which raises the VBB voltage, a VBB voltage detection circuit 150 to which the VBB node is connected and which generates a signal that activates the ring oscillator 130 and the VBB voltage raising circuit 140, a constant voltage generating circuit 160 for generating a voltage that serves as a reference for the VBB voltage detection circuit 150, and a resistor 170 that is connected to the output node of the charge pump circuit 120.

The VBB voltage detection circuit 150 includes a second comparison voltage generating circuit 151, a reference voltage generating circuit 152, a non-inverting amplifier 153 for raising the VBB voltage, a non-inverting amplifier 154 for lowering the VBB voltage, a third comparison voltage generating circuit 156, and a capacitor C2.

Embodiment 2 differs from Embodiment 1 only in the comparison voltage generating circuit that makes up the VBB voltage detection circuit, and is identical thereto in all other structural aspects. In the case of Embodiment 1, the comparison voltages VCOMPL and VCOMPH were both generated by the comparison voltage generating circuit 51, but in this embodiment, the comparison voltage VCOMPL is generated by the second comparison voltage generating circuit 151 and the comparison voltage VCOMPH is generated by the third comparison voltage generating circuit 156.

The comparison voltage generating circuit 151 is a series circuit of a resistor R11 and a resistor R12. One terminal of the resistor R11 is connected to a node of the constant voltage VREG that is output from the constant voltage generating circuit 160, and the other end is connected to one terminal of the resistor R12 and also connected to a node of the comparison voltage VCOMPL that is applied to the non-inverting input terminal (+) of the non-inverting amplifier 154 for lowering the VBB voltage. The other end of the resistor R12 is connected to the VBB node.

The comparison voltage generating circuit 156 is a series circuit of a resistor R15 and a resistor R16. One terminal of the resistor R15 is connected to a node of the constant voltage VREG that is output from the constant voltage generating circuit 160, and the other end is connected to one terminal of the resistor R16 and is also connected to a node of the comparison voltage VCOMPH that is applied to the non-inverting input terminal (+) of the non-inverting amplifier 153 for raising the VBB voltage. The other end of the resistor R16 is connected to the VBBOUT node.

The reference voltage generating circuit 152 is a series circuit of a resistor R13 and a resistor R14. One terminal of the resistor R13 is connected to the node of the constant voltage VREG that is output from the constant voltage generating circuit 160, and the other end is connected to one terminal of the resistor R14 and is also connected to the node of the reference voltage VREF, which is applied to the inverting input terminal (−) of the non-inverting amplifier 153 and the inverting input terminal (−) of the non-inverting amplifier 154. The other end of the resistor R14 is connected to the ground voltage VSS node.

The capacitor C2 is connected between the reference voltage VREF node and the ground voltage VSS.

The operation of the semiconductor memory device of this embodiment configured as above is described below.

The comparison voltage VCOMPL that is generated by the comparison voltage generating circuit 151 is compared to the reference voltage VREF that is generated by the reference voltage generating circuit 152, and if the comparison voltage VCOMPL is a higher voltage than the reference voltage VREF, then BBDOWN becomes HIGH voltage and the ring oscillator 130 generates a pulse signal that causes the charge pump circuit 120 to a perform charge pumping operation and thereby lower the VBB voltage. Also, the comparison voltage VCOMPH that is generated by the comparison voltage generating circuit 156 is compared to the reference voltage VREF that is generated by the reference voltage generating circuit 152, and if the comparison voltage VCOMPH is a lower voltage than the reference voltage VREF, then NBBUP becomes LOW voltage, and the VBB voltage raising circuit 140 is activated so that current from the VDD power source flows to the VBB node and the VBB voltage is raised. This mechanism through which the VBB voltage is raised and lowered based on the results of comparing the reference voltage VREF to the two comparison voltages VCOMPL and VCOMPH is the same as that of Embodiment 1.

The VCOMPH voltage is determined by the voltage division ratio of the resistor R15 and the resistor R16, and is expressed by Equation (7).

$$VCOMPH = VBBOUT + \{R16(VREG - VBBOUT)\}/(R15 + R16) \qquad \text{Equation (7)}$$

The VCOMPL voltage is determined by the voltage division ratio of the resistor R11 and the resistor R12, and is expressed by Equation (8).

$$VCOMPL=VBB+\{R12(VREG-VBB)\}/(R11+R12) \quad \text{Equation (8)}$$

The VREF voltage is determined by the voltage division ratio of the resistor R13 and the resistor R14, and is expressed by Equation (9).

$$VREF=(R14 \times VREG)/(R13+R14) \quad \text{Equation (9)}$$

Here, if the VBB voltage when VCOMPH and VREF are equal, that is, the detection voltage for raising the VBB voltage, is given as VBBUP, then VBBUP is expressed by Equation (10).

$$VBBUP=(R14 \times R15 - R13 \times R16)VREG/R15(R13+R14) \quad \text{Equation (10)}$$

Here, if the VBB voltage when VCOMPL and VREF are equal, that is, the detection voltage for lowering the VBB voltage through charge pumping, is given as VBBDN, then VBBDN is expressed by Equation (11).

$$VBBDN=(R14 \times R11 - R13 \times R12)VREG/R11(R13+R14) \quad \text{Equation (11)}$$

To summarize the above relationships, when the VBB voltage is larger than the detection voltage VBBDN, the charge pump circuit 120 is activated in order to lower the VBB voltage, and the VBB voltage is lowered, and when the VBBOUT voltage is smaller than the detection voltage VBBUP, the VBB voltage raising circuit 140 is activated in order to raise the VBB voltage, and the VBB voltage is raised.

Here, the resistances of the resistors R11, R2, R15, and R16 are set based on the above equations (7) and (8), so that the voltage value of the comparison voltage VCOMPH is larger than the comparison voltage VCOMPL.

As mentioned above, the resistor 170 is inserted between the VBB node and the VBBOUT node, and due to the filtering effect of the resistor 170, the amplitude fluctuation width of the VBBOUT node is smaller than the amplitude fluctuation width of the VBB node. Consequently, the amplitude fluctuation width that corresponds to the comparison voltage VCOMPH is a smaller value than the amplitude fluctuation width that corresponds to the comparison voltage VCOMPL.

Figure 9:
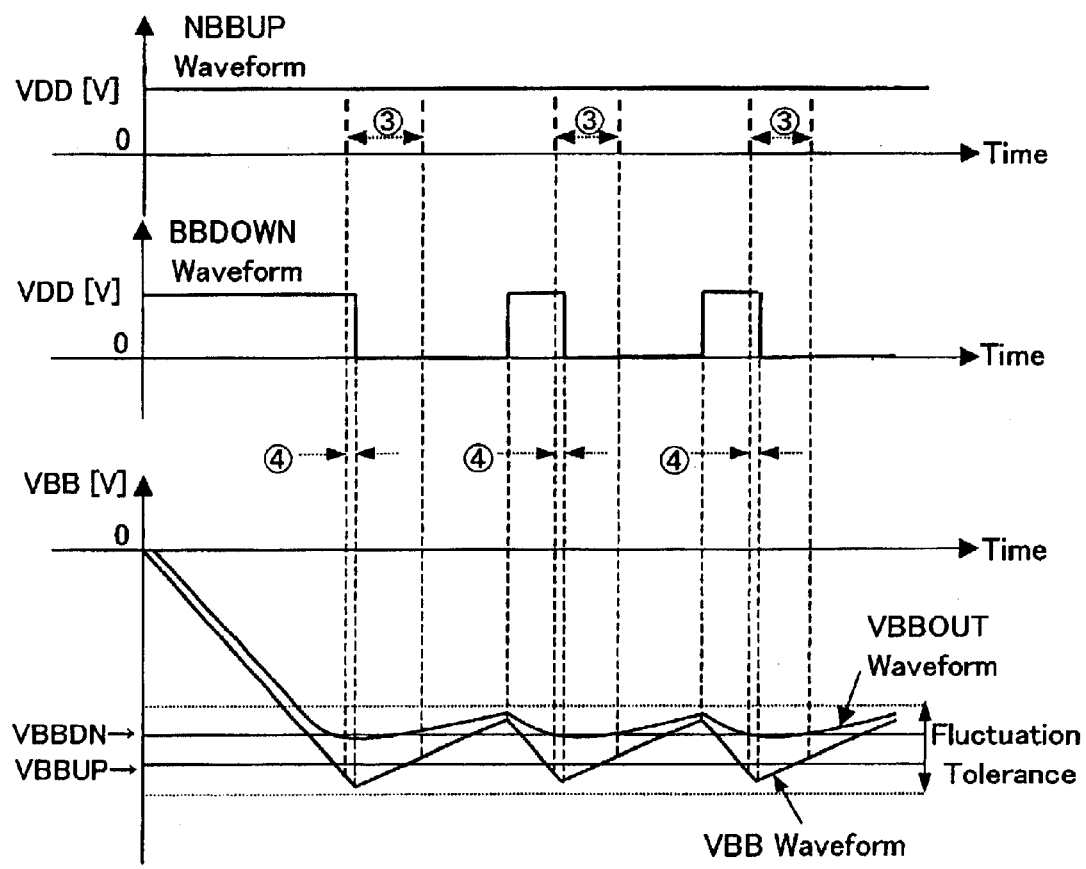
FIG. 9 is a diagram of the operational waveforms of the semiconductor memory device of FIG. 8.

FIG. 9 shows the VBB waveform and the VBBOUT waveform. The upper section of FIG. 9 is the NBBUP waveform, the middle section is the BBDOWN waveform, and the lower section is the VBB waveform and the VBBOUT waveform. The horizontal axis denotes time and the vertical axis denotes voltage.

As illustrated in the lower section of FIG. 9, the situation that is explained below occurs when the difference between the detection voltages VBBDN and VBBUP is small, that is, when it is desirable to keep the fluctuation tolerance of the VBB voltage small for the specifications, or when the actual detection voltages VBBDN and VBBUP fluctuate due to processing-related variation during manufacturing and as a result the voltage difference therebetween has become small. That is, if under such conditions the comparison voltages VCOMPH and VCOMPL of the non-inverting amplifier 153 and the non-inverting amplifier 154 are both generated from the voltage of the VBB node, which fluctuates greatly in a saw-tooth fashion as shown in the lower section of FIG. 9, then the difference in the response times of the amplifiers may result in periods where the NBBUP signal and the BBDOWN signal are activated simultaneously. More specifically, the voltage of the VBB node falls below the detection voltage VBBUP, and after a slight delay, the NBBUP signal becomes LOW voltage, as shown by the broken line, for the period (3) shown in the upper section of FIG. 9. At this time, when there has been a large response time delay in the non-inverting amplifier 154 and the BBDOWN signal is still HIGH voltage as a result, the states of activation overlap in the period (4). In other words, the NBBUP signal and the BBDOWN signal are both activated, and this causes the VBB voltage raising circuit 140 and the charge pump circuit 120 to operate simultaneously. As a consequence, there is a large consumption of current.

Accordingly, as shown in FIG. 8, the comparison voltage VCOMPH of the non-inverting amplifier 153 for raising the VBB voltage is generated from the voltage of the VBBOUT node, which due to the filtering effects of the resistor 170 is more gentle and has a smaller fluctuation width than the VBB waveform shown in the lower section of FIG. 9. Thus, the voltage of the VBBOUT node does not reach the detection voltage VBBUP, so that the NBBUP waveform shown in the upper section of FIG. 9 stays HIGH voltage as shown by the solid line. Consequently, the VBB voltage raising circuit 140 is not operated and an increase in current consumption due to the simultaneous operation of the VBB voltage raising circuit 140 and the charge pump circuit 120 is inhibited. Thus, when it is desirable to keep the fluctuation tolerance of the VBB voltage small, or when the actual detection voltages VBBDN and VBBUP fluctuate due to processing-related variations during manufacturing and as a result the voltage difference between them has become small, an increase in the current consumption due to the simultaneous operation of the VBB voltage raising circuit 140 and the charge pump circuit 120 can be avoided.

Embodiment 3

Figure 10:
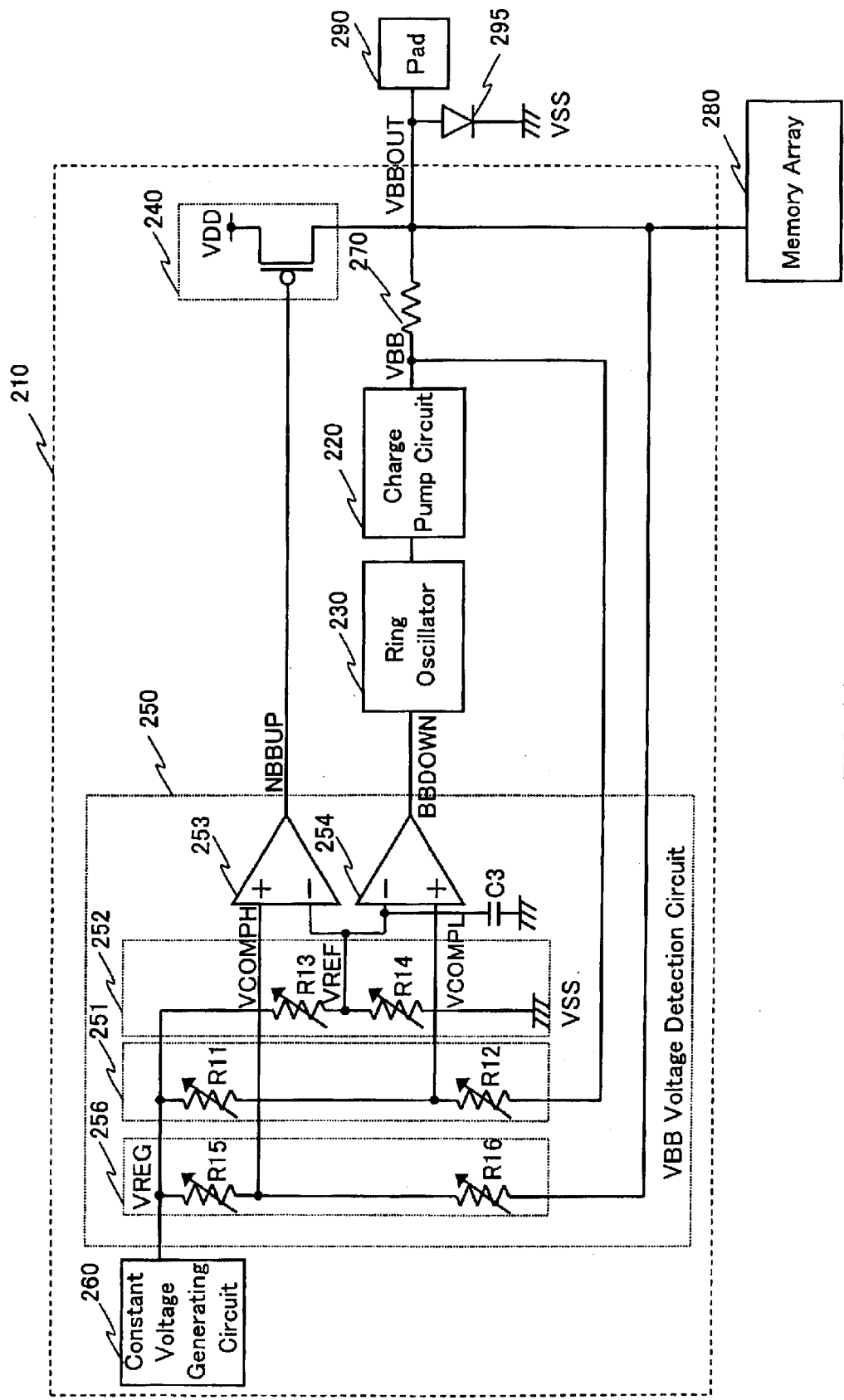
FIG. 10 is a block diagram showing a semiconductor memory device according to Embodiment 3 of the present invention.

FIG. 10 is a block diagram showing the semiconductor memory device according to Embodiment 3. In FIG. 10, numeral 210 denotes a VBB voltage generating circuit. The output node of the VBB voltage generating circuit 210 is connected to a memory cell array 280 having a memory cell plate that serves as a load, a pad 290 that either supplies VBB voltage from outside the DRAM or monitors the VBB voltage that is generated by the VBB voltage generating circuit 210, and a protective diode 295.

The VBB voltage generating circuit 210 includes a charge pump circuit 220 for generating VBB voltage, a ring oscillator 230 for generating a pulse signal that causes the charge pump circuit 220 to perform a charge pump operation, a VBB voltage raising circuit 240 whose output is connected to the VBBOUT node and that is for raising the VBB voltage, a VBB voltage detection circuit 250 connected to the VBB node and that is for generating a signal that activates the ring oscillator 230 and the VBB voltage raising circuit 240, a constant voltage generating circuit 260 for generating a voltage that serves as a reference for the VBB voltage detection circuit 250, and a resistor 270 that is connected to the output node of the charge pump circuit 220.

The VBB voltage detection circuit 250 includes a second comparison voltage generating circuit 251, a reference voltage generating circuit 252, a non-inverting amplifier 253 for raising the VBB voltage, a non-inverting amplifier 254 for lowering the VBB voltage, a third comparison voltage generating circuit 256, and a capacitor C3.

The following is a description of the operation of the semiconductor memory device of this embodiment configured as above.

This embodiment differs from Embodiment 2 in that the output node of the VBB voltage raising circuit 240 is connected to the VBBOUT node, and other structural aspects are identical. Consequently, a detailed description of the voltage detection mechanism of this embodiment is omitted because it operates in the same way as the voltage detection mechanism described in Embodiment 2 and the above-mentioned equations (8) to (11) can be applied as they are.

If the output node of the VBB voltage raising circuit 240 is connected to the VBBOUT node as mentioned to above, then when the voltage of the VBBOUT starts to drop significantly due to capacitive coupling of the memory cell plate, the operation of the VBB voltage raising circuit 240 causes current to be supplied directly from the VDD power source to the VBBOUT node. Thus, the waveform of the VBBOUT has greater fluctuation in its amplitude than the above-mentioned voltage waveform shown in the lower section of the FIG. 9. The oscillation width of the voltage increases, and as a result, the width of the signal that appears in the VCOMPH becomes larger.

Incidentally, in Embodiment 2, it was possible to avoid an increase in current consumption caused by the simultaneous operation of the VBB voltage raising circuit 140 and the charge pump 120 because the waveform of the VBBOUT had a small amplitude width and a gentle slope. However, the small amplitude of the VBBOUT node leads to diminished sensitivity in the VBB voltage raising circuit 140 with respect to voltage changes. Accordingly, by setting the output node of the VBB voltage raising circuit 240 to the VBBOUT node, the fluctuation in the amplitude of the VBBOUT node when the VBB voltage raising circuit 240 is in operation is greater than in Embodiment 2. Thus, the sensitivity of the VBB voltage raising circuit 240 system with respect to changes in voltage is increased. Consequently, fluctuations in the amplitude of the VBBOUT node during operation of the VBB voltage raising circuit 240 are responded to quickly, so that a more stable VBB power source voltage can be supplied to the memory cell plate serving as a load.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A semiconductor integrated circuit device comprising:
    a charge pump circuit for outputting a predetermined negative voltage to a negative voltage node;
    a voltage detection circuit for generating a first detection signal when the voltage of the negative voltage node has reached a first detection voltage and for generating a second detection signal when the voltage of the negative voltage node has reached second detection voltage;
    an oscillator that is driven in response to the first detection signal so as to generate a signal for driving the charge pump circuit; and
    a negative voltage raising circuit that has an output terminal connected to the negative voltage node, and that is driven in response to the second detection signal so as to raise the voltage of the negative voltage node through the output of its output terminal;
    wherein the voltage detection circuit comprises:
        a first comparison voltage generating circuit for outputting a first comparison voltage and a second comparison voltage in response to the voltage of the negative voltage node;
        a reference voltage generating circuit for outputting a reference voltage;
        a first amplifier for comparing the reference voltage and the first comparison voltage and amplifying the voltage difference between them to generate the first detection signal; and
        a second amplifier for comparing the reference voltage and the second comparison voltage and amplifying the voltage difference between them to generate the second detection signal.

2. The semiconductor integrated circuit device according to claim 1, wherein the first comparison voltage generating circuit comprises a first resistive element, a second resistive element and a third resistive element;
    wherein one terminal of the first resistive element is connected to a constant voltage node, another terminal of the first resistive element is connected to one terminal of the second resistive element, another terminal of the second resistive element is connected to one terminal of the third resistive element, and another terminal of the third resistive element is connected to the negative voltage node; and
    wherein the second comparison voltage is the voltage of a node at which the first resistive element and the second resistive element are connected, and the first comparison voltage is the voltage of a node at which the second resistive element and the third resistive element are connected.

3. The semiconductor integrated circuit device according to claim 1, wherein the reference voltage generating circuit comprises a fourth resistive element and a fifth resistive element;
    wherein one terminal of the fourth resistive element is connected to a constant voltage node, another terminal of the fourth resistive element is connected to one terminal of the fifth resistive element, and another terminal of the fifth resistive element is connected to a ground voltage; and
    wherein the reference voltage is the voltage of a node at which the fourth resistive element and the fifth resistive element are connected.

4. The semiconductor integrated circuit device according to claim 3, wherein the fourth resistive element and the fifth resistive element have variable resistances, and by changing the resistances of the fourth resistive element and the fifth resistive element, the voltage value of the reference voltage that is output from the reference voltage generating circuit can be changed.

5. The semiconductor integrated circuit device according to claim 2, wherein the first resistive element, the second resistive element, and the third resistive element have variable resistances, and by changing the resistances of the first resistive element, the second resistive element, and the third resistive element, the voltage values of the first comparison voltage and the second comparison voltage that are output from the comparison voltage generating circuit can be changed.

6. The semiconductor integrated circuit device according to claim 4, wherein each of the fourth resistive element and the fifth resistive element includes a plurality of resistors connected in series, a fuse is connected in parallel to at least one of the resistors, and the overall resistance can be changed by opening at least one of the fuses.

7. The semiconductor integrated circuit device according to claim 5, wherein each of the first, second, and the third resistive elements includes a plurality of resistors connected in series, a fuse is connected in parallel to at least one of the resistors, and the overall resistance can be changed by opening at least one of the fuses.

8. The semiconductor integrated circuit device according to claim 2, wherein the reference voltage generating circuit comprises a fourth resistive element and a fifth resistive element, one terminal of the fourth resistive element is connected to a constant voltage node, another terminal of the fourth resistive element is connected to one terminal of the fifth resistive element, and another terminal of the fifth resistive element is connected to a ground voltage, the reference voltage being the voltage of a node at which the fourth resistive element and the fifth resistive element are connected; and wherein at least one of the fist, second, third, fourth, and fifth resistive elements includes a plurality of resistors connected in series, a fuse is connected in parallel to at least one of the resistors, and the overall resistance can be changed by opening at least one of the fuses.

9. The semiconductor integrated circuit device according to claim 8, wherein the resistances of the plurality of resistors are set so that the negative voltage is changed linearly by trimming the fuse.

10. The semiconductor integrated circuit device according to claim 1, wherein the negative voltage raising circuit comprises a transistor having a control terminal for receiving the second detection signal, a terminal connected to a positive voltage power source, and a terminal connected to the negative voltage node.

11. The semiconductor integrated circuit device according to claim 1, wherein the negative voltage raising circuit comprises a transistor having a control terminal driven in response to the second detection signal, a terminal that is grounded, and a terminal connected to the negative voltage node.

12. The semiconductor integrated circuit device according to claim 1, wherein the first amplifier and the second amplifier have respective first and second current mirror-type differential amplifiers, and a constant current value of the transistor serving as a constant current source of the second current mirror-type differential amplifier is larger than a constant current value of the transistor serving as a constant current source of the first current mirror-type differential amplifier.

13. The semiconductor integrated circuit device according to claim 1, wherein each of the first amplifier and the second amplifier has a three-stage current mirror-type differential amplifier.

14. The semiconductor integrated circuit device according to claim 1, wherein the first comparison voltage is lower than the second comparison voltage.

15. The semiconductor integrated circuit device according to claim 1, wherein the number of transistors making up the negative voltage raising circuit can be changed corresponding the size of a load that is connected to the negative voltage node.

16. The semiconductor integrated circuit device according to claim 1, further comprising a resistor, one terminal of which is connected to the negative voltage node and another terminal of which is connected to a load.

17. The semiconductor integrated circuit device according to claim 16, further comprising a memory cell array, wherein the load is a memory cell plate of the memory cell array.

18. The semiconductor integrated circuit device according to claim 17, wherein the size of the load can be changed depending on the number of installed memory bits, and the number of transistors making up the negative voltage raising circuit can be changed in response to the number of installed memory bits.

19. The semiconductor integrated circuit device according to claim 17, wherein the size of the load can be changed depending on the number of activated blocks of the memory cell array, and the number of transistors making up the negative voltage raising circuit can be changed in response to the number of activated blocks.

20. The semiconductor integrated circuit device according to claim 13, further comprising a diode, one terminal of which is connected to a node connecting the resistor and the load, and another end of which is connected to a ground voltage.

21. The semiconductor integrated circuit device according to claim 13, further comprising a pad connected to a node connecting the resistor and the load, wherein via the pad, voltage can be imparted from the outside, and a voltage of the node can be detected.

22. The semiconductor integrated circuit device according to claim 16, wherein on output node of the negative voltage raising circuit is connected to a node connecting the resistor and the load, and an output node of the negative voltage raising circuit is connected to the negative voltage node via the resistor.

23. The semiconductor integrated circuit device according to claim 1, further comprising a resistor, one terminal of the resistor being connected to the negative voltage node and another terminal of the resistor being connected to a load, wherein the first comparison voltage generating circuit comprises a second comparison voltage generating circuit and a third comparison voltage generating circuit;

the second comparison voltage generating circuit has a sixth resistive element and a seventh resistive element, one terminal of the sixth resistive element being connected to a constant voltage node, another terminal of the sixth resistive element being connected to one terminal of the seventh resistive element, and another terminal of the seventh resistive element being connected to the negative voltage node;

the third comparison voltage generating circuit has an eighth resistive element and a ninth resistive element, one terminal of the eighth resistive element being connected to the constant voltage node, another terminal of the eighth resistive element being connected to one terminal of the ninth resistive element, and another terminal of the ninth resistive element being connected to a node linking the resistor and the load; and the first comparison voltage is the voltage of a node at which the sixth resistive element and the seventh resistive element are connected, and the second comparison voltage is the voltage of a node at which the eighth resistive element and the ninth resistive element are connected.

24. The semiconductor integrated circuit device according to claim 23, wherein each of the eighth resistive element and the ninth resistive element have variable resistances, and by changing the resistances of the eighth resistive element and the ninth resistive element, the voltage value of the second comparison voltage that is output from the comparison voltage generating circuit can be changed.

25. The semiconductor integrated circuit device according to claim 23, wherein each of the sixth resistive element and the seventh resistive element have variable resistances, and by changing the resistances of the sixth resistive element and the seventh resistive element, the voltage value of the first comparison voltage that is output from the comparison voltage generating circuit can be changed.

26. The semiconductor integrated circuit device according to claim 1, wherein a difference between a set value of the first detention voltage and a set value of a second detection voltage is larger than a maximum value of the total of an offset voltage of the first amplifier and an offset voltage of the second amplifier.

27. The semiconductor integrated circuit device according to claim 1, wherein a capacitor is inserted between a reference voltage node to which output of the reference voltage generating circuit is supplied and a ground voltage.

28. A method of manufacturing a semiconductor integrated circuit device, comprising:

preparing a semiconductor integrated circuit device comprising:
- a charge pump circuit for outputting a predetermined negative voltage to a negative voltage node;
- a voltage detection circuit for generating a first detection signal when the voltage of the negative voltage node has reached a first detection voltage and for generating a second detection signal when the voltage of the negative voltage node has reached a second detection voltage;
- an oscillator that is driven in response to the first detection signal so as to generate a signal for driving the charge pump circuit; and
- a negative voltage raising circuit that has an output terminal connected to the negative voltage node, and that is driven in response to the second detection signal so as to raise the voltage of the negative voltage node through the output of its output terminal;

wherein the voltage detection circuit comprises:
- a first comparison voltage generating circuit for outputting a first comparison voltage and a second comparison voltage in response to the voltage of the negative voltage node;
- a reference voltage generating circuit for outputting a reference voltage;
- a first amplifier for comparing the reference voltage and the first comparison voltage and amplifying the voltage difference between them to generate the first detection signal; and
- a second amplifier for comparing the reference voltage and the second comparison voltage and amplifying the voltage difference between them to generating the second detection signal;

wherein the reference voltage generating circuit comprises a fourth resistive element and a fifth resistive element;

wherein one terminal of the fourth resistive element is connected to a constant voltage node, another terminal of the fourth resistive element is connected to one terminal of the fifth resistive element, and another terminal of the fifth resistive element is connected to a ground voltage; and wherein the reference voltage is the voltage of a node at which the fourth resistive element and the fifth resistive element are connected;

wherein the fourth resistive element and the filth resistive element have variable resistances, and by changing the resistances of the fourth resistive element and the fifth resistive element, the voltage value of the reference voltage that is output from the reference voltage generating circuit can be changed; and further comprising a resistor, one terminal of which is connected to the negative voltage node and another terminal of which is connected to a load, and a pad that is connected to a node connecting the resistor and the load, wherein a voltage of the negative voltage node can be detected via the pad; and detecting, during wafer testing, a voltage appearing on the pad and adjusting the resistances of the fourth resistive element and the fifth resistive element so as to adjust the voltage value of the reference voltage that is output from the reference voltage generating circuit.

29. A method of manufacturing a semiconductor integrated circuit device comprising:

preparing a semiconductor integrated circuit device comprising:
- a charge pump circuit for outputting a predetermined negative voltage to a negative voltage node;
- a voltage detection circuit for generating a first detection signal when the voltage of the negative voltage node has reached a first detection voltage and for generating a second detection signal when the voltage of the negative voltage node has reached a second detection voltage;
- an oscillator that is driven in response to the first detection signal so as to generate a signal for driving the charge pump circuit; and
- a negative voltage raising circuit that has an output terminal connected to the negative voltage node, and that is driven in response to the second detection signal so as to raise the voltage of the negative voltage node through the output of its output terminal;

wherein the voltage detection circuit comprises:
- a first comparison voltage generating circuit for outputting a first comparison voltage and a second comparison voltage in response to the voltage of the negative voltage node;
- a reference voltage generating circuit for outputting a reference voltage;
- a first amplifier for comparing the reference voltage and the first comparison voltage and amplifying the voltage difference between them to generate the first detection signal; and
- a second amplifier for comparing the reference voltage and the second comparison voltage and amplifying the voltage difference between them to generate the second detection signal;

wherein the first comparison voltage generating circuit comprises a first resistive element a second resistive element and a third resistive element;

wherein one terminal of the first resistive element is connected to a constant voltage node, another terminal of the first resistive element is connected to one terminal of the second resistive element, another terminal of the second resistive element is connected to one terminal of the third resistive element, and another terminal of the third resistive element is connected to the negative voltage node; and wherein the second comparison voltage is the voltage of a node at which the first resistive element and the second resistive element are connected, and the first comparison voltage is the voltage of a node at which the second resistive element and the third resistive element are connected;

wherein the first resistive element, the second resistive element, and the third resistive element have variable resistances, and by changing the resistances of the first resistive element, the second resistive element, and the third resistive element, the voltage values of the first comparison voltage and the second comparison voltage that are output from the comparison voltage generating circuit can be changed; and further comprising a resistor, one terminal of which is connected to the negative voltage node and another terminal of which is connected to a load, and a pad that is connected to a node connecting the resistor and the load, wherein a voltage of the negative voltage node can be detected via the pad; and detecting, during wafer testing, a voltage appearing on the pad and adjusting the resistances of the first resistive element, the second resistive element, and the third resistive element so as to adjust the voltage values of the first comparison voltage and the second comparison voltage that are output from the comparison voltage generating circuit.

* * * * *